US010969296B2

(12) United States Patent
Sivarkkamani et al.

(10) Patent No.: US 10,969,296 B2
(45) Date of Patent: Apr. 6, 2021

(54) LEAK-DETECTION SYSTEMS INCLUDING INSPECTION VEHICLES AND LEAK-DETECTION DEVICES

(71) Applicant: General Electric Company, Schenectady, NY (US)

(72) Inventors: Aarthi Sivarkkamani, Sandy Springs, GA (US); Brian Kenneth Bassett, Lyman, SC (US); Luis Armando Sanchez Del Valle, Acworth, GA (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 16/194,813

(22) Filed: Nov. 19, 2018

(65) Prior Publication Data

US 2020/0158592 A1 May 21, 2020

(51) Int. Cl.
*G01M 3/22* (2006.01)
*G01M 3/28* (2006.01)

(52) U.S. Cl.
CPC ............ *G01M 3/22* (2013.01); *G01M 3/2807* (2013.01)

(58) Field of Classification Search
CPC .................................. G01M 3/04; G01M 3/22
See application file for complete search history.

(56) References Cited

U.S. PATENT DOCUMENTS 3,420,091 A  1/1969 Franklin
4,736,826 A * 4/1988 White ................. B25J 5/007
                                                     191/12.2 A (Continued)

FOREIGN PATENT DOCUMENTS

CN    101561081 B     8/2012
CN    203581168 U  *  5/2014
CN    208313523 U  *  1/2019

OTHER PUBLICATIONS

Muhammad Asif Arain et al., "Efficient Measurement Planning for Remote Gas Sensing with Mobile Robots", 2015 IEEE International Conference on Robotics and Automation (ICRA), May 26-30, 2015. (Year: 2015).*

(Continued)

*Primary Examiner* — David A. Rogers
(74) *Attorney, Agent, or Firm* — James Pemrick; Hoffman Warnick LLC

(57) ABSTRACT

Leak-detection systems for detecting fluid leaks in component(s) included in an apparatus are disclosed. The leak-detection systems may include an inspection vehicle for inspecting the component(s) of the apparatus. The inspection vehicle may include at least one camera positioned on a housing, and a fluid-detection tool coupled to the housing. The fluid-detection tool may detect fluids leaking from the component(s) of the apparatus. The leak-detection system may also include a leak-detection device in electronic communication with the fluid-detection tool of the inspection vehicle. The leak-detection device may be configured to identify a specific component of the apparatus leaking a fluid using fluid detection data generated by the fluid-detection tool of the inspection vehicle, and predetermined component data relating to each component of the apparatus. The leak-detection device may also be configured to provide a notification including component-leak information relating to the specific component of the apparatus leaking the fluid.

19 Claims, 18 Drawing Sheets

(56) References Cited

U.S. PATENT DOCUMENTS

| | | | |
|---|---|---|---|
| 6,459,955 B1* | 10/2002 | Bartsch | A47L 9/00 700/245 |
| 8,369,990 B2 | 2/2013 | Zesch et al. | |
| 9,291,603 B2 | 3/2016 | Thommen-Stamenkov et al. | |
| 9,310,252 B2* | 4/2016 | Das | G01J 5/0003 |
| 9,744,671 B2* | 8/2017 | Connell, II | G06F 16/51 |
| 2007/0021867 A1* | 1/2007 | Woo | H04L 12/282 700/245 |
| 2008/0011057 A1* | 1/2008 | Spaolonzi | G01M 3/047 73/40 |
| 2009/0210175 A1* | 8/2009 | Bilpuch | G01M 3/24 702/51 |
| 2011/0174565 A1 | 7/2011 | Rochat et al. | |
| 2011/0298609 A1* | 12/2011 | Mekid | G01M 3/005 340/539.1 |
| 2012/0078417 A1* | 3/2012 | Connell, II | B25J 13/087 700/248 |
| 2013/0199272 A1* | 8/2013 | Khalifa | G01M 3/005 73/40.5 A |
| 2013/0311407 A1* | 11/2013 | Das | G01J 5/0003 706/12 |
| 2016/0148417 A1* | 5/2016 | Kim | G06T 19/006 345/419 |
| 2016/0368135 A1* | 12/2016 | Tadayon | B25J 5/00 |
| 2016/0371519 A1* | 12/2016 | Tucker | G06K 7/10366 |
| 2017/0015003 A1* | 1/2017 | Sutherland | B25J 5/007 |
| 2017/0225336 A1* | 8/2017 | Deyle | G08B 13/196 |
| 2017/0307465 A1* | 10/2017 | Yokono | G01M 3/24 |
| 2018/0059678 A1* | 3/2018 | Bakhishev | H04W 24/08 |
| 2018/0080846 A1* | 3/2018 | Zhang | G01M 15/14 |

OTHER PUBLICATIONS

Machine Translation of CN-203581168-U Which Originally Published on May 7, 2014. (Year: 2014).*

Machine Translation of CN-208313523-U Which Originally Published on Jan. 1, 2019. (Year: 2019).*

Wei Xu et al., "Modularization Design of Inspection Robot Based on Substation", Proceedings from the 2nd International Conference on Mechanical Control and Automation, May 26-28, 2017. (Year: 2017).*

Remote Detection and Localization of Gas Leaks, SMB Products, date unknown.*

Researchers Develop an Autonomous Gas Leak Detection Robot, FLIR Systems Australia Pty Ltd., Mar. 31, 2014. (Year: 2014).*

Barchyn et al., "A UAV-based System for Detecting Natural Gas Leaks", Journal of Unmanned Vehicle Systems, Sep. 22, 2017, 19 pages, JUVS-2017-0018.

Satterlee, Lucas, "Climate Drones: A New Tool for Oil and Gas Air Emission Monitoring", Environmental Law Institute, Dec. 2016, pp. 11069-11083, 46 ELR.

Rossi et al., "Gas-Drone: Portable Gas Sensing System on UAV's for Gas Leakage Localization", IEEE, 2014, 4 pages.

Parfett, Nicholas, "Towards Autonomous Target Detection and Gas Sensing Using a UAV in an Indoor Environment", Queensland University of Technology, 2018, 13 pages.

* cited by examiner

LEAK-DETECTION SYSTEMS INCLUDING INSPECTION VEHICLES AND LEAK-DETECTION DEVICES

BACKGROUND OF THE INVENTION

The disclosure relates generally to detecting fluid leaks in an apparatus, and more particularly, to a leak-detection system for detecting fluid leaks in component(s) included in an apparatus.

Conventional turbomachines, such as gas turbine systems, steam turbine systems, and combined cycle power plants generate power for electric generators. In general, these systems include a plurality of sub-systems and/or apparatus, each of which includes numerous parts or components that provide a specific function or operation for the system. In order for systems to operate at a desired operational efficiency and/or to perform for the expected part or operational life, regular maintenance and inspection of the systems and its various apparatuses must be performed. Undetected degradation of these parts, components, sub-systems, and/or apparatuses may decrease the operational efficiency of the system and/or may reduce the operational life of the part. For example, where a cooling fluid line of a turbomachine is leaking cooling fluid (e.g., cooling gas or air), the cooling fluid line may not be capable of providing a desired amount of cooling fluid to a specific component (e.g., turbine casing) of the turbomachine during operation. As a result of not receiving the required amount of cooling fluid, the component may experience undesirable, elevated temperatures, which may decrease the component's operational efficiency and/or shorten the operational life of the component.

To detect fluid leaks within the turbomachines, a user may manually inspect the parts, components, sub-systems, and/or apparatuses. For example, a user may walk through the systems of the turbomachine, and visually and/or audibly inspect the various parts, components, sub-systems, and/or apparatuses included therein. However, this conventional form of inspection may be inadequate where the fluid leaking within the system is not visible to the eye of the user, a cause for the leak (e.g., crack or loose coupling of components) is not visibly detectable by the user, and/or the auditory signal generated by the leaking fluid is not detectable (e.g., low frequency, ambient noise during operation) by the inspecting user. In addition to the limitations created by the user, manually inspecting the parts, components, sub-systems, and/or apparatuses based on sight and/or sound may be time-consuming and is limited to be performed only on portions of the turbomachine that may be accessed by the inspecting user. Additionally, performing the manual inspection on some portions of the turbomachine may not be safe during operation, due to the potential exposure to hot and/or harmful gases, and/or dangerous conditions (e.g., gas lines within a combustor). As a result, the conventional, manual inspection process typically requires the turbomachine to be shutdown for an extended period of time.

Another conventional form of inspection may be performing a "bubble test," where the parts, components, sub-systems, and/or apparatuses of the turbomachine are covered in a solution. When performing the bubble test, any leaking fluid may cause the solution to bubble, which provides a visual indication that a leak exists within the turbomachine. The bubble test may provide a more accurate and/or identifiable indication that a leak exists within one of the parts, components, sub-systems, and/or apparatuses of the turbomachine. However, this form of inspection is also time-consuming, typically requiring that inspected portions of the system be shutdown, and/or is limited to portions of the turbomachine that may be accessed by the inspecting user.

BRIEF DESCRIPTION OF THE INVENTION

A first aspect of the disclosure provides a leak-detection system, including: an inspection vehicle for inspecting a plurality of components of an apparatus, the inspection vehicle including: at least one camera positioned on a housing; a fluid-detection tool coupled to the housing, the fluid-detection tool detecting fluids leaking from the plurality of components of the apparatus; and a propulsion assembly coupled to the housing, the propulsion assembly moving the inspection vehicle; and a leak-detection device in electronic communication with the fluid-detection tool of the inspection vehicle, the leak-detection device configured to: identify a specific component of the plurality of components of the apparatus leaking a fluid using: fluid detection data generated by the fluid-detection tool of the inspection vehicle; and predetermined component data relating to each of the plurality of components of the apparatus; and provide a notification including component-leak information relating to the specific component of the plurality of components of the apparatus leaking the fluid.

A second aspect of the disclosure provides a leak-detection system, including: an inspection vehicle for inspecting a plurality of components of an apparatus, the inspection vehicle including: at least one camera positioned on a housing, the at least one camera obtaining at least one real-time image of the plurality of components of the apparatus; a fluid-detection tool coupled to the housing, the fluid-detection tool generating a leak-image of a fluid leaking from a specific component of the plurality of components of the apparatus; and a propulsion assembly coupled to the housing, the propulsion assembly moving the inspection vehicle; and a leak-detection device in electronic communication with the fluid-detection tool of the inspection vehicle, the leak-detection device configured to: identify the specific component of the plurality of components of the apparatus leaking the fluid using: the leak-image generated by the fluid-detection tool of the inspection vehicle; and predetermined component data relating to each of the plurality of components of the apparatus; and provide a notification including component-leak information relating to the specific component of the plurality of components of the apparatus leaking the fluid.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure, it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to detecting fluid leaks in an apparatus, and more particularly, to a leak-detection system for detecting fluid leaks in component(s) included in an apparatus.

These and other embodiments are discussed below with reference to FIGS. 1-18. However, those skilled in the art will readily appreciate that the detailed description given herein with respect to these Figures is for explanatory purposes only and should not be construed as limiting.

Figure 1:
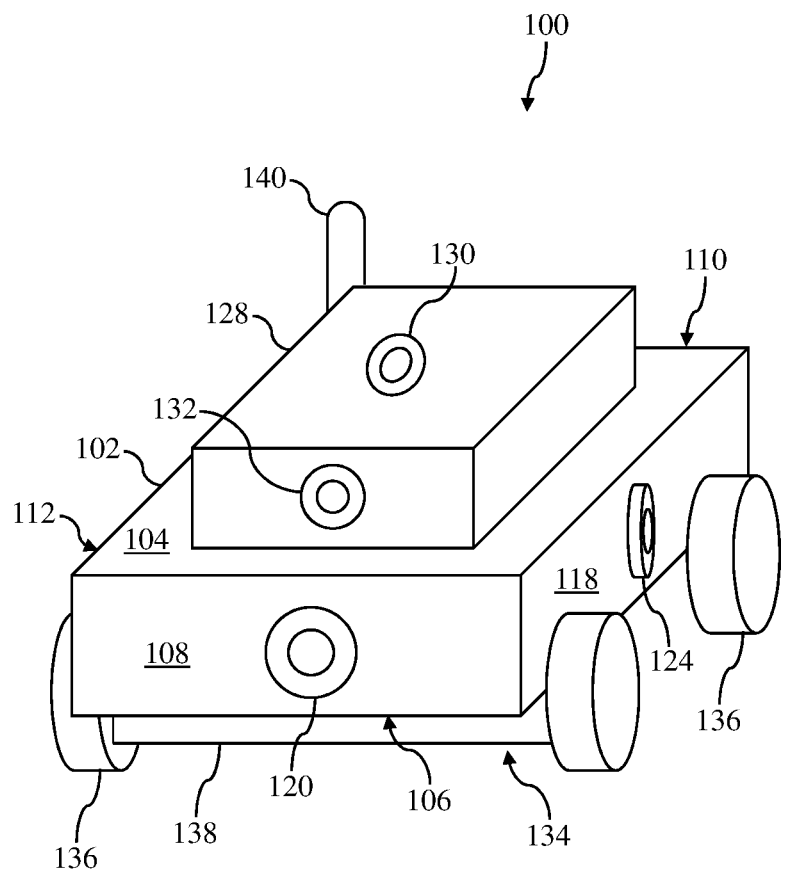
FIG. 1 shows a perspective view of an inspection vehicle of a leak-detection system, according to embodiments.
Figure 2:
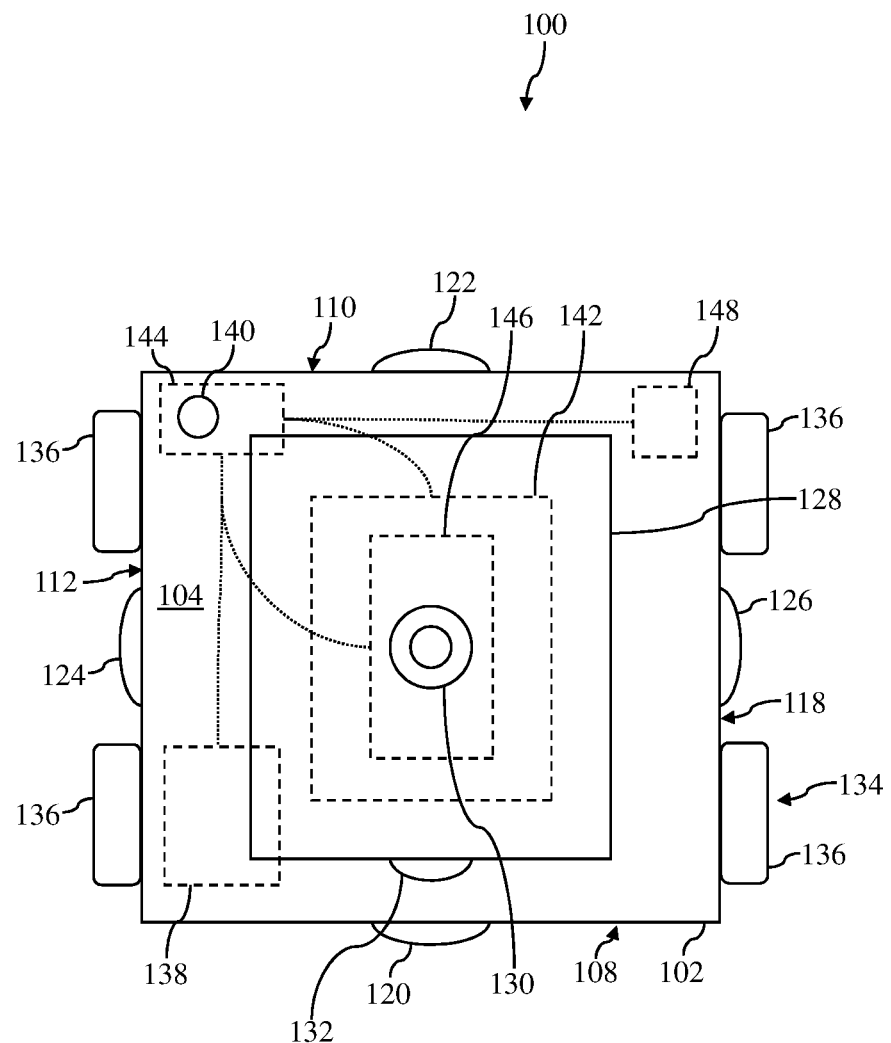
FIG. 2 shows a top view of the inspection vehicle shown in FIG. 1, according to embodiments.
Figure 3:
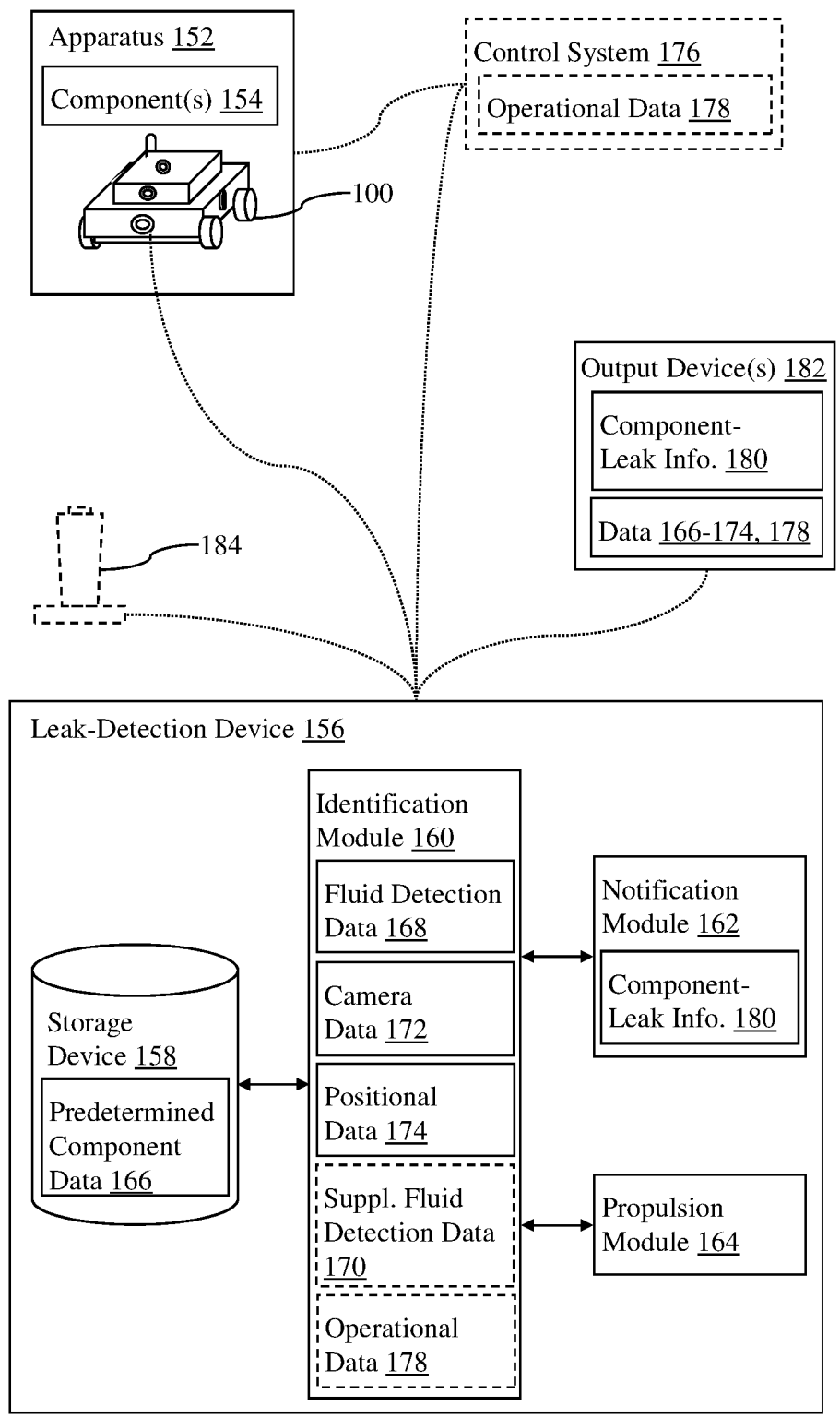
FIG. 3 shows a schematic view of a leak-detection system including the inspection vehicle of FIGS. 1 and 2, and a leak-detection device in communication with the inspection vehicle, according to embodiments.

FIGS. 1 and 2 show various views of a non-limiting example of an inspection vehicle 100 used to detect fluid leaks in an apparatus (see, FIG. 3). Specifically, FIG. 1 shows a perspective view of inspection vehicle 100, and FIG. 2 shows a top view of inspection vehicle 100. As shown in FIGS. 1 and 2 inspection vehicle 100 may include a body or housing 102 (hereafter "housing 102"). Housing 102 of inspection vehicle 100 may be formed as a rigid structure that may provide support, include, house, contact, and/or receive various components of inspection vehicle 100, as discussed herein. In the non-limiting example housing 102 may be formed as a cuboid and/or may have a cubic or cuboid shape. As such, housing 102 may include a top surface 104, a bottom surface 106 (see, FIG. 1) positioned opposite top surface 104, a front side 108 extending (vertically) between top surface 104 and bottom surface 106, and a back side 110 positioned opposite front side 108. Similar to front side 108, back side 110 may extend (vertically) between top surface 104 and bottom surface 106 of housing 102. Additionally, housing 102 may also include at least two opposing sides 112, 118 extending (horizontally) between front side 108 and back side 110, and (vertically) between top surface 104 and bottom surface 106, respectively. Although shown as a cuboid, it is understood that housing 102 may be formed as any three-dimensional structure that may be shaped or formed to provide support, house, and/or receive the various components of inspection vehicle 100, as well as allow inspection vehicle 100 to detect fluid leaks within an apparatus (see, FIG. 3), as discussed herein. As such, housing 102 of inspection vehicle 100 may include more or fewer surfaces and/or sides than those shown and discussed herein with respect to FIGS. 1 and 2.

Inspection vehicle 100 may also include at least one camera 120, 122, 124, 126 positioned on housing 102. As shown in FIGS. 1 and 2, at least one camera 120, 122, 124, 126 may be positioned on, positioned within, coupled to, and/or formed substantially integral with housing 102, and more specifically various surfaces and/or sides of housing 102 of inspection vehicle 100. For example, a first camera 120 may be positioned on and/or coupled to front side 108 of housing 102, and a second camera 122 may be positioned on and/or coupled to back side 110 of housing 102, opposite first camera 120. Additionally a third camera 124 may be positioned on and/or coupled to side 112. A fourth camera 126 may be coupled to back side 110 positioned on and/or coupled to side 118 of housing 102. As discussed herein, cameras 120, 122, 124, 126 may be configured to obtain camera data, which may include at least one real-time image of the apparatus, during the inspection process. Cameras 120, 122, 124, 126 of inspection vehicle 100 may be formed as any suitable camera device that may obtain camera data and/or capture real-time images of an apparatus being inspected by inspection vehicle 100 during the inspection process, as discussed herein. For example, cameras 120, 122, 124, 126 may be formed as a still or picture camera, a video camera or camcorder, a night-vision camera, an infrared camera, or any other suitable device capable of capturing images or videos of an apparatus.

Although inspection vehicle 100 shows four cameras 120, 122, 124, 126 positioned on housing 102, it is understood that the number of cameras shown in inspection vehicle 100 is illustrative. As such, inspection vehicle 100 may include more or fewer cameras for use during the inspection process discussed herein.

As shown in FIGS. 1 and 2, inspection vehicle 100 may also include at least one fluid-detection tool 128. In the non-limiting example, fluid-detection tool 128 may be coupled to and/or positioned on housing 102 of inspection vehicle 100. In other non-limiting examples (not shown) fluid-detection tool 128 may be positioned within, housed, contained, and/or formed substantially integral with housing 102, similar to cameras 120, 122, 124, 126. Fluid-detection tool 128 may include at least one device (e.g., camera) 130, 132 that may allow fluid-detection tool 128 to detect fluids (e.g., gases) leaking from components of the apparatus during the inspection process. As shown in FIGS. 1 and 2, a first device 130 may be positioned and/or oriented in a plane substantially parallel to front side 108, and/or substantially perpendicular to top surface 104 of housing 102 of inspection vehicle 100, and a second device 132 may be positioned and/or oriented in a plane substantially parallel to top surface 104, and/or substantially perpendicular to front side 108 of housing 102.

As discussed herein, fluid-detection tool 128 may be configured to detect fluids (e.g., gases) leaking within the apparatus and generate fluid detection data during the inspection process. In non-limiting examples, fluid-detection tool 128 may include and/or be formed as a real-time ultrasound imaging device, an acoustic camera, or the like. As such, devices 130, 132 of fluid-detection tool 128 may be formed as a camera device or lens for the fluid-detection tool 128. As discussed herein, the fluid detection data generated by fluid-detection tool 128 may include, for example, leak-images of the fluid leaking from component(s) of the apparatus that may include a visual representation (e.g., colored image) of the leaking fluid. Although fluid-detection tool 128 shows two devices 130, 132, it is understood that the number of devices shown in fluid-detection tool 128 is illustrative. As such, fluid-detection tool 128 may include more or fewer devices for use during the inspection process discussed herein. Additionally, the position and/or orientation of the devices 130, 132 on or within fluid-detection tool 128 is illustrative. As such, devices 130, 132 may be positioned on and/or oriented in distinct areas of fluid-detection tool 128 of inspection vehicle 100 than those shown and discussed herein with respect to FIGS. 1 and 2.

In the non-limiting example shown in FIGS. 1 and 2, inspection vehicle 100 may also include a propulsion assembly 134. Propulsion assembly 134 may be coupled to and/or formed on housing 102 of inspection vehicle 100 to move and/or propel inspection vehicle 100 when performing the inspection process of the components of the apparatus, as discussed herein. In the non-limiting example shown, propulsion assembly 134 may include a plurality of wheels 136, and at least one drive train 138 coupled to and/or in communication with wheels 136. Wheels 136 of propulsion assembly 134 may be any suitable wheels or traversal components, for example, a rack and pinion, slidable coupling, continuous track, and/or other traversal mechanisms that may be configured to move inspection vehicle 100 within apparatus during the inspection process, as discussed herein. Additionally, the at least one drive train 138 may be formed as any suitable drive assembly or system that may be configured to drive wheels 136 and/or propel inspection vehicle 100 when performing the inspection process. In a non-limiting, each of the plurality of wheels 136 of inspection vehicle 100 may be formed as magnet wheels that may be configured to be magnetically coupled and/or traverse magnetic components of the apparatus during the inspection process. In other non-limiting examples, wheels 136 may be formed as rubber wheels including suspension that may traverse obstacles on the surface of apparatus that may be traversed by inspection vehicle 100 during the inspection process. In the non-limiting examples, drive train(s) 138 may be formed as an electro-mechanical drive train that may be mechanically coupled to and configured to drive or rotate wheels 136 of inspection vehicle 100 during the inspection process, as discussed herein.

As shown in FIG. 1, inspection vehicle 100 may also include an antenna 140. In the non-limiting example antenna 140 may be positioned on and/or extend from top surface 104 of housing 102 for inspection vehicle 100. Antenna 140 of inspection vehicle 100 may be formed as any suitable transmitter-receiver device that may transmit data obtained by and/or receive data intended for inspection vehicle 100 during the inspection process, as discussed herein. For example, antenna 140 may be formed as a wireless transmitter-receiver that may be in communication with the various systems included within inspection vehicle 100 (see, FIG. 2) and various devices of a leak-detection system (see, FIG. 3) used to perform the inspection process discussed herein. Antenna 140 in some cases may be structurally integrated into other portions of vehicle 100, such that antenna 140 is not visible to an observer.

Turning to FIG. 2, and with continued reference to FIG. 1, various systems of each tool and/or assembly of inspection vehicle 100 are shown. Each of the various systems of inspection vehicle 100 may be included, positioned, and/or housed within housing 102 and/or fluid-detection tool 128 of inspection vehicle 100. For example, inspection vehicle 100 may include a camera system 142 positioned within housing 102 of inspection vehicle 100. Camera system 142 may be in electronic communication with and/or operably coupled to cameras 120, 122, 124, 126 as well as an antenna system 144 of antenna 140. As discussed herein, camera system 142 may be in electronic communication with and/or operably coupled to cameras 120, 122, 124, 126 to receive, process, and/or generate the camera data obtained by cameras 120, 122, 124, 126. Camera system 142 of inspection vehicle 100 may also provide the camera data to antenna system 144 of antenna 140, which in turn may transmit the camera data to devices of the leak-detection system (see, FIG. 3), which may analyze and/or use the camera data during the inspection process.

Additionally, in the non-limiting example, inspection vehicle 100 may include a fluid-detection system 146 positioned within fluid-detection tool 128 of inspection vehicle 100. Fluid-detection system 146 may be in electronic communication with and/or operably coupled to fluid-detection tool 128 (e.g., device(s) 130, 132) as well as an antenna system 144 of antenna 140. Fluid-detection system 146 may be in electronic communication with and/or operably coupled to device(s) 130, 132 of fluid-detection tool 128 to receive and/or process the fluid detection data generated by fluid-detection tool 128. Similar to camera system 142, fluid-detection system 146 of inspection vehicle 100 may also provide the fluid detection data to antenna system 144 of antenna 140, which in turn may transmit the fluid detection data to devices of the leak-detection system (see, FIG. 3), which may analyze and/or use the fluid detection data during the inspection process.

Inspection vehicle 100 may also include a global positioning system (GPS) tracking unit 148 (hereafter, "tracking unit 148") positioned within and/or coupled to housing 102. Tracking unit 148 may be coupled to, positioned and/or included within housing 102 of inspection vehicle 100 in order to generate positional data for inspection vehicle 100 while inspection vehicle 100 performs the inspection process of the apparatus, as discussed herein. Tracking unit 148 may be in electronic communication with and/or operably coupled to antenna system 144 of antenna 140 to provide the positional data of inspection vehicle 100 to antenna system 144 of antenna 140. As discussed herein, antenna system 144 may then transmit the positional data, using antenna 140, to devices of the leak-detection system (see, FIG. 3), which may analyze and/or use the positional data of inspection vehicle 100 during the inspection process.

Additionally, as shown in FIG. 2, antenna system 144 may be in electronic communication with and/or operably coupled to drive train 138 of propulsion assembly 134 coupled to housing 102 of inspection vehicle 100. During the inspection process, devices of the leak-detection system (see, FIG. 3) may provide instructions to drive train 138, using antenna 140 and antenna system 144, to adjust the position of inspection vehicle 100 within the apparatus. As discussed herein, the instruction to change position of inspection vehicle 100 may aid inspecting the apparatus, and more specifically, detecting a fluid-leak within a component(s) included within the apparatus.

FIG. 3 show a schematic view of a leak-detection system 150 including inspection vehicle 100. Specifically, FIG. 3 shows a schematic view of leak-detection system 150 including inspection vehicle 100 positioned within an apparatus 152, and various distinct devices. Apparatus 152 may be formed as any suitable machine, device, assembly, and/or apparatus that may include at least one component configured to transport fluid therein. Additionally, apparatus 152 may be formed as any suitable machine, device, assembly, and/or apparatus that may benefit (e.g., improved operation and/or component-operational life) from undergoing an inspection process using leak-detection system 150, as discussed herein. In a non-limiting example discussed herein (see, FIGS. 4-6), apparatus 152 may be formed as an exhaust housing for a gas turbine system, and components 154 may be formed as exhaust lines or conduits configured to remove various gases (e.g., fluids) that may flow within and/or be used by the gas turbine system.

Additionally, as discussed herein leak-detection system 150, and its various devices, may use inspection vehicle 100 to inspect apparatus 152, and more specifically detect a fluid-leak within a component(s) 154 included within apparatus 152. Inspection vehicle 100 shown in FIG. 3 may be substantially similar to inspection vehicle 100 shown and discussed herein with respect to FIGS. 1 and 2. It is understood that similarly numbered and/or named components may function in a substantially similar fashion. Redundant explanation of these components has been omitted for clarity.

As shown in FIG. 3 leak-detection system 150 may include various devices. For example, leak-detection system 150 may include leak-detection device 156. Leak-detection device 156 may be in electronic communication with and/or operably coupled inspection vehicle 100 and the various systems included therein via antenna 140 and antenna system 144. For example, leak-detection device 156 may in electronic communication with and/or operably coupled to fluid-detection tool 128 and fluid-detection system 146 of inspection vehicle 100. Leak-detection device 156 may also be operably coupled to and/or in electronic communication with cameras 120, 122, 124, 126 and camera system 142, as well as tracking unit 148 of inspection vehicle 100. Additionally, Leak-detection device 156 may be in electronic communication with and/or operably coupled to propulsion assembly 134, and more specifically drive train 138, of inspection vehicle 100. As discussed herein, leak-detection device 156 may be operably coupled to inspection vehicle 100, and its various system, to obtain the various forms of data (e.g., camera data, fluid detection data, positional data, and so on), and use the data to detect a fluid-leak within a component(s) 154 included within apparatus 152 during the inspection process. Additionally, leak-detection device 156 may be operably coupled to inspection vehicle 100, and its various system, to transmit data (e.g., instructions to drive train 138) to inspection vehicle 100 during the inspection process performed on apparatus 152.

Leak-detection device 156 may include, for example, a storage device 158, an identification module 160, a notification module 162, and a propulsion module 164. Storage device 158, identification module 160, notification module 162, and propulsion module 164 of leak-detection device 156 may all be operably coupled and/or in electronic communication with one another. As a result, storage device 158, identification module 160, notification module 162, and propulsion module 164 may share, obtain, and/or transfer data when performing the inspection process on apparatus 152, and more specifically when detecting and identifying a fluid-leak within a component(s) 154 included within apparatus 152, as discussed herein.

Storage device 158 of leak-detection device 156 may be formed as any suitable component or device that may be configured to store information and/or data therein. As shown in FIG. 3, storage device 158 may store predetermined component data 166. Predetermined component data 166 may relate to each component(s) 154 of apparatus 152. That is, predetermined component data 166 may include data relating to each component(s) 154 included within apparatus 152 that may be inspected by inspection vehicle 100 during the inspection process, as discussed herein. Predetermined component data 166 may be stored on storage device 158 prior to performing the inspection process using inspection vehicle 100. In non-limiting examples, predetermined component data 166 may include a location of each component(s) 154 of and/or within apparatus 152, a feature of each component(s) 154 of apparatus 152, a component identification (ID) tag for each component 154 of apparatus 152, a feature ID tag for each of feature of component(s) 154 of apparatus 152, a known composition of the fluid flowing through each component 154 of apparatus 152, a desired temperature range of the fluid flowing through each component 154 of apparatus 152, and/or a desired pressure range for the fluid flowing through each component 154 of apparatus 152. Additionally or alternatively, predetermined component data 166 stored on storage device 158 may include a schematic or visual representation of apparatus 152 including each component 154. In non-limiting examples, and as discussed herein (see, FIGS. 8 and 10) the schematic or visual representation of apparatus 152 including component 154 may include, but is not limited to, a previously captured and analyzed image of apparatus 152 including component(s) 154, and/or a three-dimensional (3D) computer model of apparatus 152 including component(s) 154 previously generated using any of a large variety of well-known computer aided design (CAD) software systems such as AutoCAD®, TurboCAD®, DesignCAD 3D Max, etc. As discussed herein, predetermined component data 166 stored on storage device 158 may be provided to and/or obtained by identification module 160 of leak-detection device 156 in order to identify a specific component 154 of apparatus 152 that may be leaking a fluid during the inspection process.

Leak-detection device 156 may also include an identification module 160. Identification module 160 may be configured to identify a specific component 154 of apparatus 152 that may be leaking a fluid during the inspection process, as discussed herein. Identification module 160 may identify the specific component using data obtained from various devices, components, and/or systems of leak-detection system 150. For example, and as discussed herein, identification module 160 may be in communication with storage device 158 to obtain and/or receive predetermined component data 166 to aid in identifying the specific component 154 of apparatus 152 that may be leaking a fluid. Additionally, identification module 160 may be in communication with inspection vehicle 100 to obtain and/or receive information and/or data obtained by inspection vehicle 100 and its various devices, tools, components, and/or systems to aid in identifying the specific component 154 of apparatus 152 that may be leaking a fluid. For example, identification module 160 may obtain, receive, and/or analyze fluid detection data 168, and when applicable supplemental fluid detection data 170 (shown in phantom), generated by fluid-detection tool 128 and/or fluid-detection system 146 of inspection vehicle 100. Fluid detection data 168 and/or supplemental fluid detection data 170 may be obtained and/or received by identification module 160 in real-time or at predetermined intervals from inspection vehicle 100 during the inspection process.

Fluid detection data 168, and/or supplemental fluid detection data 170, generated by fluid-detection tool 128 and/or fluid-detection system 146 may relate and/or include information and/or data relating to the specific, detected fluid leaking from component(s) 154 of apparatus 152. That is, fluid detection data 168 and/or supplemental fluid detection data 170 may include data relating to the fluid that is detected and/or determined to be leaking from component(s) 154 included within apparatus 152 during the inspection process, as discussed herein. In non-limiting examples where fluid-detection tool 128 is formed as a real-time ultrasound imaging device or acoustic camera, fluid detection data 168 and/or supplemental fluid detection data 170 may include at least one leak-image of the detected-fluid leaking from component(s) 154 of apparatus 152 (see, FIG. 11). As discussed herein, the leak-image generated by fluid-detection tool 128 of inspection vehicle 100 may include, for example, a visual representation (e.g., color Doppler) of the fluid leaking from component(s) 154, as well as at least a portion of component(s) 154 leaking the fluid. The leak-image may aid in identify the specific component 154 and/or a feature of component(s) 154 leaking the fluid. In other non-limiting examples, fluid detection data 168 and/or supplemental fluid detection data 170 may include the composition of the fluid leaking from component(s) 154 of apparatus 152, an actual or detected temperature of the fluid leaking from component(s) 154 of apparatus 152, an actual or detected flow rate of the fluid leaking from component(s) 154 of apparatus 152, or any other suitable data able to be obtained by fluid-detection tool 128 of inspection vehicle 100 and used to identify component(s) 154 leaking fluid.

In additional non-limiting examples, identification module 160 may obtain, receive, and/or analyze additional data from distinct devices, components, and/or systems of inspection vehicle 100 of leak-detection system 150. For example, identification module 160 may obtain, receive, and/or analyze camera data 172 (e.g., real-time image of components 154) generated by camera(s) 120, 122, 124, 126 and/or camera system 142 of inspection vehicle 100. Identification module 160 may also obtain, receive, and/or analyze positional data 174 generated by tracking unit 148 of inspection vehicle 100.

In another non-limiting example, and where applicable, leak-detection device 156, and more specifically identification module 160, may be in communication with and/or operably coupled to a control system 176 (shown in phantom as optional) for apparatus 152. In the non-limiting example, control system 176 for apparatus 152 may control, adjust, and/or regulate the operation of apparatus 152 and/or the components 154 of apparatus 152. Additionally, control system 176 may generate operational data 178 relating to operation and/or function of apparatus 152 and/or components 154 of apparatus 152. For example, operational data 178 may include a real-time or actual pressure of the fluid flowing through components 154 of apparatus 152, and/or a real-time or actual operational efficiency of apparatus 152 and/or components 154. Identification module 160 may be in communication with control system 176 to obtain and/or receive operational data 178 to aid in identifying the specific component 154 of apparatus 152 that may be leaking a fluid when performing the inspection process using inspection vehicle 100, as discussed herein.

Using the various data (e.g., predetermined component data 166, fluid detection data 168, camera data 172, positional data 174, etc.) from distinct portions, devices, components, and/or systems of leak-detection system 150, identification module 160 may identify a specific component(s) 154 of apparatus 152 that may be leaking fluid. That is, and as discussed herein, during the inspection process identification module 160 may analyze and/or process the data received and/or obtained in leak-detection device 156 to identify the specific component(s) 154 that may be undesirably leaking fluid within apparatus 152. Additionally in a non-limiting example, identification module 160 may identify a feature or portion of the specific component(s) 154 that may be undesirably leaking fluid within apparatus 152 using the data received and/or obtained in leak-detection device 156.

As shown in FIG. 3, the non-limiting example of leak-detection device 156 may also include notification module 162. Notification module 162 may be configured to provide a notification relating to the detected leak within apparatus 152. More specifically, notification module 162 may provide a notification including component-leak information 180 relating to the specific component(s) 154 (and feature of specific component(s) 154) that may be identified by identification module 160 as leaking fluid within apparatus 152. Notification module 162 may be in electronic communication with and/or operably coupled to at least one output device 182 of leak-detection system 150 for providing the notification including component-leak information 180. Output device 182 may display and/or provide a visual (e.g. printout) of the notification including component-leak information 180, as provided by notification module 162 of leak-detection device 156. In another non-limiting example, output device 182 may display and/or provide a visual depiction of at least a portion of the various data obtained and/or generated by distinct portions, devices, components, and/or systems of leak-detection system 150 (e.g., fluid detection data 168, camera data 172, etc.). Output device 182 may be formed as any suitable device, component, or system that may provide a visual of the notification including component-leak information 180 and/or other data obtained and/or generated by leak-detection system 150. For example, output device 182 may be formed as a monitor or display that may provide real-time visuals of component-leak information 180 provided by notification module 162, camera data 172 generated by camera(s) 120, 122, 124, 126 and/or camera system 142 of inspection vehicle 100, and fluid-detection data 168 generated by fluid-detection tool 128 and/or fluid-detection system 146 of inspection vehicle 100. In another non-limiting example, output device 182 may be a printer that may provide a print out of component-leak information 180 provided by notification module 162, camera data 172, and fluid-detection data 168.

Component-leak information 180 included in the notification provided by notification module 162, and displayed by output device(s) 182, may include a variety of information relating to the identified component(s) 154 leaking fluid within apparatus 152. For example, component-leak information 180 may include: the location of the specific, identified component(s) 154 of and/or within apparatus 152 leaking fluid; the feature of the specific, identified component(s) 154 of apparatus 152 leaking fluid; the component ID tag for the specific, identified component(s) 154 of apparatus 152 leaking fluid; the feature ID tag for the specific, identified component(s) 154 of apparatus 152 leaking fluid; the known composition of the fluid leaking from the specific, identified component(s) 154; the desired temperature range of the fluid leaking from the specific, identified component(s) 154; and/or the desired pressure range for leaking from the specific, identified component(s) 154. Additionally in non-limiting examples, component-leak information 180 may include the actual or detected temperature of the fluid leaking from the specific, identified component(s) 154 of apparatus 152, and/or the actual or detected flow rate of the fluid leaking from the specific, identified component(s) 154 of apparatus 152.

As shown in FIG. 3, leak-detection device 156 of leak-detection system 150 may also include a propulsion module 164. Propulsion module 164 may be in electronic communication with and/or operably coupled to propulsion assembly 134 of inspection vehicle 100, and more specifically drive train 138. In a non-limiting example, propulsion module 164 may instruct and/or provide information to propulsion assembly 134 to adjust or change the position of inspection vehicle 100 within apparatus 152 during the inspection process. In a non-limiting example, and as discussed herein, propulsion module 164 may instruct propulsion assembly 134 to change the position of inspection vehicle 100 within apparatus 152 to (continuously) perform the inspection process on apparatus 152. In another non-limiting example, propulsion module 164 may instruct propulsion assembly 134 to change the position of inspection vehicle 100 from a first position to a second position within apparatus 152 when inspection vehicle 100 and/or leak-detection device 156 detects a fluid leaking within apparatus 152, but cannot initial identify the specific component 154 leaking the fluid. Alternatively or additionally, propulsion module 164 may instruct propulsion assembly 134 to change the position of inspection vehicle 100 from the first position to the second position within apparatus 152 when inspection vehicle 100 and/or leak-detection device 156 requires additional data (e.g., supplemental fluid detection data 170, camera data 172, positional data 174) for providing the notification including component-leak information 180.

Leak-detection system 150 may also include a remote control 184 (shown in phantom as optional). Leak-detection system 150 may include remote control 184 in a non-limiting example where the movement of inspection vehicle 100 during the inspection process is not automated, but rather controlled by a user of leak-detection system 150. Remote control 184 may be in electronic communication with and/or operably coupled to leak-detection device 156, and more specifically propulsion module 164. Remote control 184 may provide movement or traversal instructions to propulsion module 164. Propulsion module 164 in electronic communication with and/or operably coupled to propulsion assembly 134 of inspection vehicle 100, may in turn provide the movement instructions received by remote control 184 to propulsion assembly 134 in order to adjust the position of inspection vehicle 100 during the inspection process, as discussed herein. Remote control 184 may be formed as any suitable device, component, or system that may be configured to move and/or control the movement of inspection vehicle 100. As shown in the non-limiting example of FIG. 3, remote control 184 may be formed as a joystick. In other non-limiting examples (not shown) remote control 184 may be formed as a plurality of joysticks, a plurality of adjustable dials or nobs, a directional pad (D-pad), motion-based control mechanisms (e.g., gyroscopic and/or acceleration-based inputs), a plurality of keys or buttons, or the like.

Figure 4:
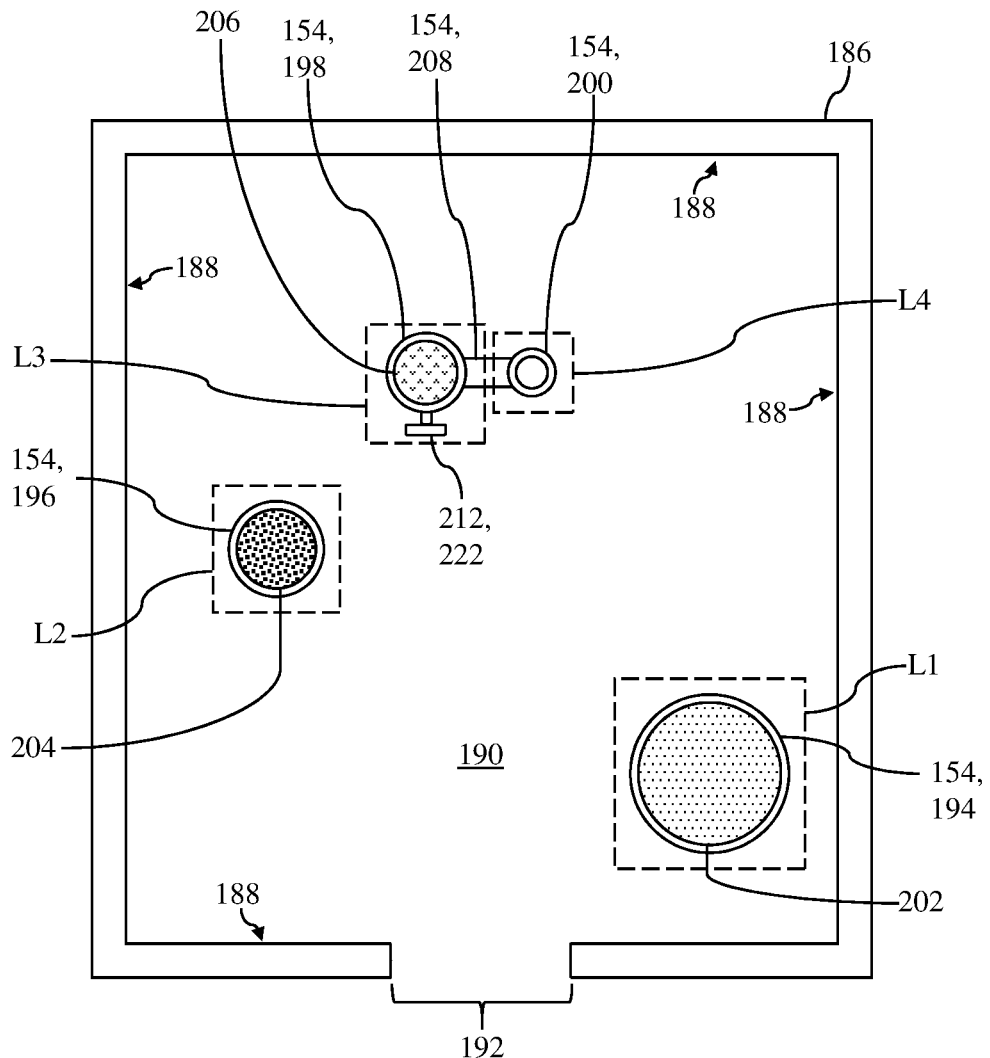
FIG. 4 shows a top view of an apparatus including a plurality of components to be inspected by the inspection vehicle of FIGS. 1 and 2, according to embodiments.
Figure 5:
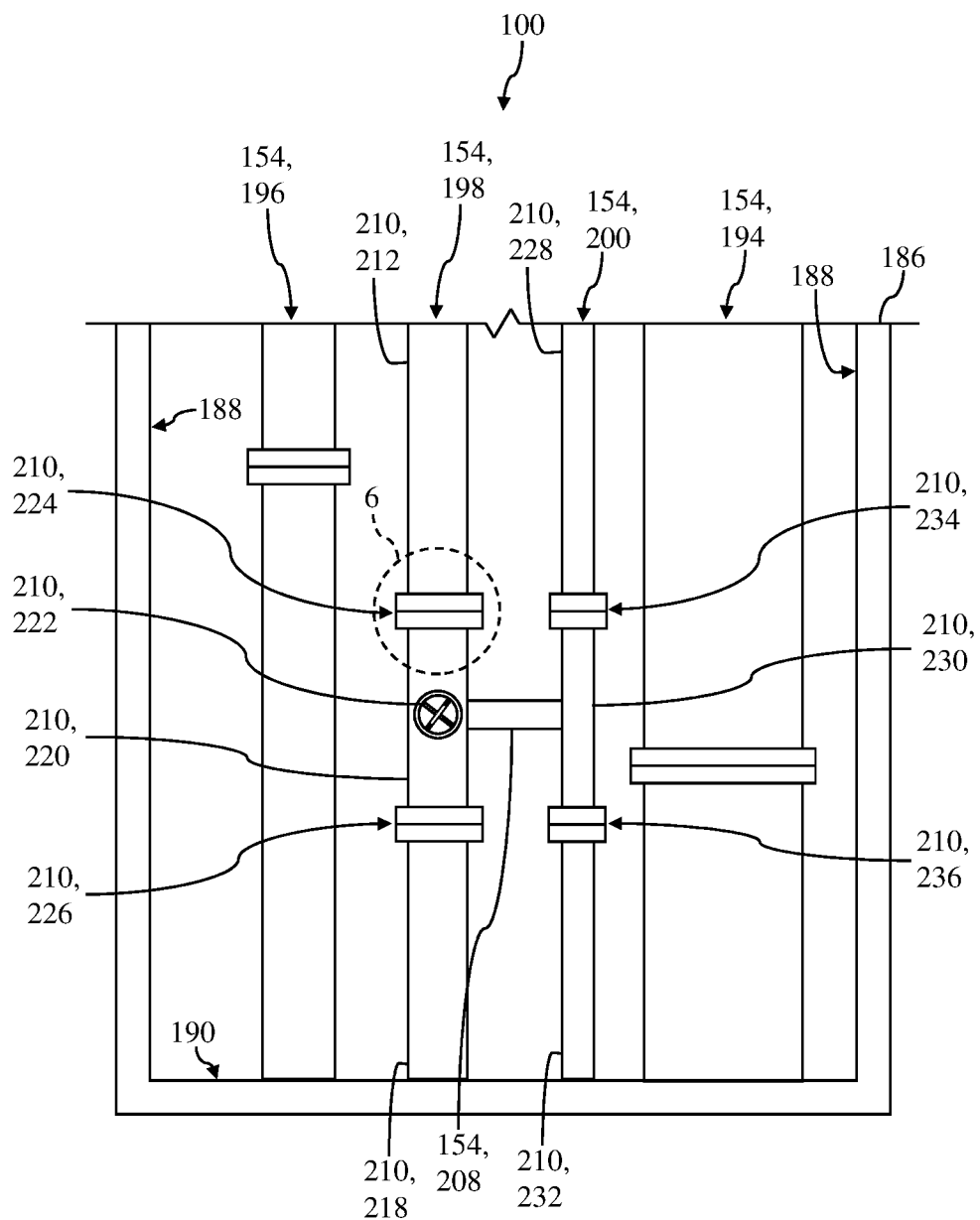
FIG. 5 shows a front view of the apparatus including the plurality of components as shown in FIG. 4, according to embodiments.
Figure 6:
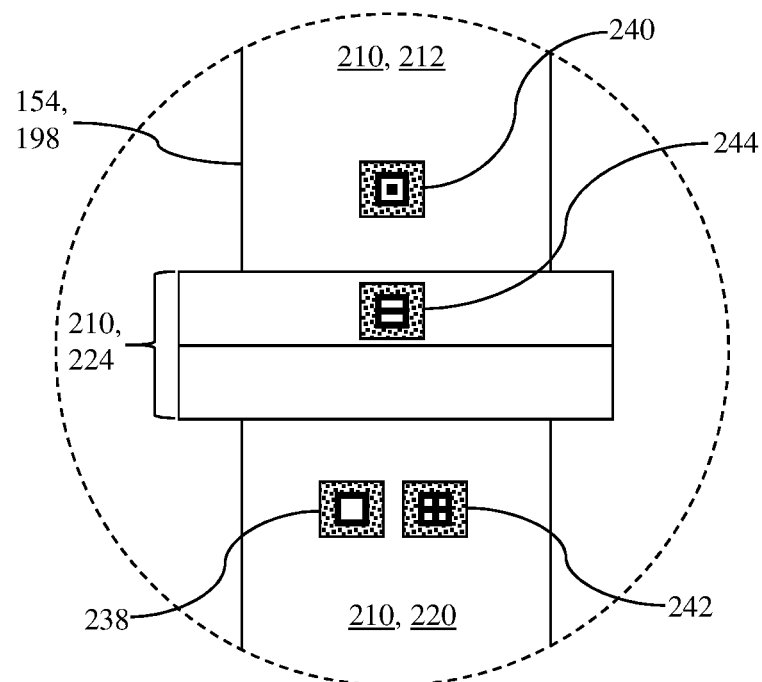
FIG. 6 shows an enlarged view of a portion of a component of the apparatus shown in FIG. 5, according to embodiments.

FIGS. 4-6 show various views of apparatus 152 including a plurality of components 154 that may undergo an inspection process using leak-detection system 150 (see, FIG. 3). More specifically, FIG. 4 shows a top schematic view of apparatus 152 including a plurality of components 154, FIG. 5 shows a front schematic view of apparatus 152 including the plurality of components 154, and FIG. 6 shows an enlarged schematic view of a portion of a single component 154 of apparatus 152. As discussed herein, apparatus 152 may be formed, for example, as an exhaust housing for a gas turbine system (not shown), and components 154 of apparatus 152 may be formed, for example, as various exhaust lines or conduits. In the non-limiting examples discussed herein, it is understood that the term "apparatus" may be interchangeable with the term "exhaust housing," and the term "component" may be interchangeable with the term "exhaust line."

Exhaust housing 186 (e.g., apparatus 152) may include a plurality of walls 188 that house and/or contain the plurality of components 154, and a base surface (e.g., floor) 190 that may substantially support the plurality of components 154. Exhaust housing 186 may also include opening 192 formed in wall 188. Opening 192 may provide access to housing 186, and in turn components 154 formed therein. As discussed herein, opening 192 may provide inspection vehicle 100 of leak-detection system 150 access to exhaust housing 186 to perform the inspection process on exhaust housing 186 and/or apparatus 152.

Additionally as shown in FIG. 4, and as discussed herein, apparatus 152 formed as exhaust housing 186 may also include the plurality of components 154 formed therein. In the non-limiting example, the plurality of components 154 may be formed as exhaust lines or conduits (hereafter, "exhaust lines") 194, 196, 198, 200. Exhaust lines 194, 196, 198, 200 may be configured to receive and/or remove various gases (e.g., fluids) that may flow within and/or be used by the gas turbine system (not shown) including exhaust housing 186. Each of the plurality of exhaust lines 194, 196, 198, 200 may receive a distinct fluid used within the gas turbine system (not shown). For example, first exhaust line 194 may include excess ambient or intake fluid 202 (e.g., air) that may be purged from an intake of the gas turbine system. Second exhaust line 196 may include excess compressed fluid 204 (e.g., compressed air) that may be purged from a compressor of the gas turbine system. Additionally, third exhaust line 198 may include exhaust fluid or exhaust gas 206 that previously flowed through the gas turbine system. In the non-limiting example, fourth exhaust line 200 may be empty (e.g., include no fluid), and may be formed as a bleed line for third exhaust line 198. As discussed herein, fourth exhaust line 200 may receive exhaust gas 206 from third exhaust line 198, via a connector 208, when a valve formed in third exhaust line 198 is in an open position.

Also as shown in FIG. 4, each exhaust line 194, 196, 198, 200 (e.g., components 154) may also be positioned within exhaust housing 186 (e.g., apparatus 152) at a location (L). More specifically, first exhaust line 194 may be positioned or formed in exhaust housing 186 at a first location (L), second exhaust line 196 may be positioned or formed in exhaust housing 186 at a second location (L2), third exhaust line 198 may be positioned or formed in exhaust housing 186 at a third location (L3), and fourth exhaust line 200 may be positioned or formed in exhaust housing 186 at a fourth location (L4). The location (L) of each exhaust line 194, 196, 198, 200 (e.g., component 154) within exhaust housing 186 may be predetermined and/or previously known and/or established based on, for example, a schematic or visual representation of exhaust housing 186 including a previously captured and analyzed image of exhaust housing 186 (e.g., apparatus 152) or a three-dimensional (3D) computer model of exhaust housing 186, as discussed herein. Also as discussed herein, the location (L) of each exhaust line 194, 196, 198, 200 within exhaust housing 186 may be included in predetermined component data 166 stored in storage device 158 of leak-detection device 156, and may be used when performing the inspection process using leak-detection system 150 (see, FIG. 3) to identify which of exhaust lines 194, 196, 198, 200 may be undesirably leaking a fluid within exhaust housing 186.

Briefly turning to FIG. 5, with continued reference to FIG. 4, each of the exhaust lines 194, 196, 198, 200 (e.g., components 154) of exhaust housing 186 (e.g., apparatus 152) may also include identifiable features or portions 210 (hereafter, "feature 210"). For example, and as shown in FIG. 5, features 210 of third exhaust line 198 may include a first conduit portion 212, a second conduit portion 218, and a valve portion 220 coupled to, fluidly coupling, and/or positioned between first conduit portion 212 and second conduit portion 218. Valve portion 220 may also include a valve 222 that may be configured to open or close connector 208 to provide exhaust gas 206 from third exhaust line 198 to fourth exhaust line 200, as discussed herein. Additionally, features 210 of third exhaust line 198 may include flanges 224, 226 where the various conduit portions 212, 218, 220 of third exhaust line 198 are coupled together. More specifically, and as shown in FIG. 5, features 210 of third exhaust line 198 may include a first flange 224 formed between and/or coupling first conduit portion 212 to valve portion 220, and a second flange 226 formed between and/or coupling valve portion 220 to second conduit portion 218.

Also shown in the non-limiting example, fourth exhaust line 200 may include similar features 210. For example, fourth exhaust line 200 may include a first conduit portion 228, and a second conduit portion 230 coupled to, fluidly coupled to, and/or positioned adjacent first conduit portion 228. Second conduit portion 230 of fourth exhaust line 200 may be in fluid communication and/or fluidly coupled to connector 208. Fourth exhaust line 200 may also include a third conduit portion 232 coupled to, fluidly coupled to, and/or positioned adjacent second conduit portion 230. Second conduit portion 230 may also be coupled to, fluidly coupling, and/or positioned between first conduit portion 228 and third conduit portion 232. Additional features 210 of fourth exhaust line 200 may include a first flange 234 formed between and/or coupling first conduit portion 228 to second conduit portion 230, and a second flange 236 formed between and/or coupling second conduit portion 230 to third conduit portion 232.

FIG. 6 shows an enlarged view of a portion of third exhaust line 198 (e.g., component 154) of exhaust housing 186 (e.g., apparatus 152) and its various features 210. More specifically, FIG. 6 shows an enlarged view of a portion of first conduit portion 212, a portion of valve portion 220, and first flange 224 of third exhaust line 198. In the non-limiting example third exhaust line 198 may include a component ID tag 238. Component ID tag 238 may be associated with and/or may be unique to third exhaust line 198 included within exhaust housing 186 (see, FIGS. 4 and 5). That is, component ID tag 238 may include a unique tag marking (e.g., barcode, QR code, data-matrix code, and the like) that may be specific and/or unique to third exhaust line 198. As discussed herein, component ID tag 238 may be used to identify third exhaust line 198 (e.g., component 154) when inspecting exhaust housing 186 of apparatus 152 to determine if third exhaust line 198 is undesirably leaking a fluid.

Similar to the entirety of third exhaust line 198 (e.g., component 154), each feature 210, including portion 212, 220 and first flange 224, of third exhaust line 198 may include an ID tag. More specifically, each portion 212, 220 and first flange 224 of third exhaust line 198 may include a unique feature ID tag 240, 242, 244. Feature ID tags 240, 242, 244 may be associated with and/or may be unique to a respective feature 210 of third exhaust line 198 included within exhaust housing 186 (see, FIGS. 4 and 5). For example, a first feature ID tag 240 may include a unique tag marking (e.g., barcode, QR code, data-matrix code, and the like) that may be specific and/or unique to first conduit portion 212 of third exhaust line 198. Additionally, a second feature ID tag 242 may include a unique tag marking that may be specific and/or unique to valve portion 220, and a third feature ID tag 244 may include a unique tag marking that may be specific and/or unique to first flange 224 formed between first conduit portion 212 and valve portion 220. As discussed herein, and similar to component ID tag 238, each feature ID tag 240, 242, 244 may be used to identify specific features 210 of third exhaust line 198 (e.g., component 154) when inspecting exhaust housing 186 of apparatus 152 to determine if the specific feature(s) 210 of third exhaust line 198 are undesirably leaking a fluid.

Similar to the location (L) of each exhaust line 194, 196, 198, 200 within exhaust housing 186 (see, FIG. 4), information and/or data relating to features 210, component ID tag 238, and/or feature ID tags 240, 242, 244 may be may be stored on storage device 158 of leak-detection system 150 (see, FIG. 3). That is, features 210, component ID tag 238, and/or feature ID tags 240, 242, 244 for each exhaust line 194, 196, 198, 200 may be included in predetermined component data 166 stored in storage device 158 of leak-detection device 156 (see, FIG. 4), and may be known or defined prior to performing the inspection process using inspection vehicle 100, as discussed herein. Also similar to location (L) of each exhaust line 194, 196, 198, 200, features 210, component ID tag 238, and/or feature ID tags 240, 242, 244 for each exhaust line 194, 196, 198, 200 may be used when performing the inspection process using leak-detection system 150 (see, FIG. 3) to identify which of exhaust lines 194, 196, 198, 200 (and/or its feature 210) may be undesirably leaking a fluid within exhaust housing 186.

Turning to FIGS. 7-12, and with continued reference to FIG. 3, a non-limiting example of performing the inspection process on exhausting housing 186 (e.g., apparatus 152) using leak-detection system 150 (see, FIG. 3) may be discussed herein. In FIGS. 7-11 several reference lines or directions may be shown and used regularly herein, and it should prove helpful to define these reference lines or directions at the onset of this section. For example, in each of FIGS. 7-11 "X," "Y," and "Z" reference lines or directions are displayed and may be used herein to describe the position of various components, features and/or directions of movement for exhaust housing 186 undergoing the inspection process and/or inspection vehicle 100 performing the inspection process. Additionally, it is understood that similarly numbered and/or named components may function in a substantially similar fashion. Redundant explanation of these components has been omitted for clarity.

Figure 7:
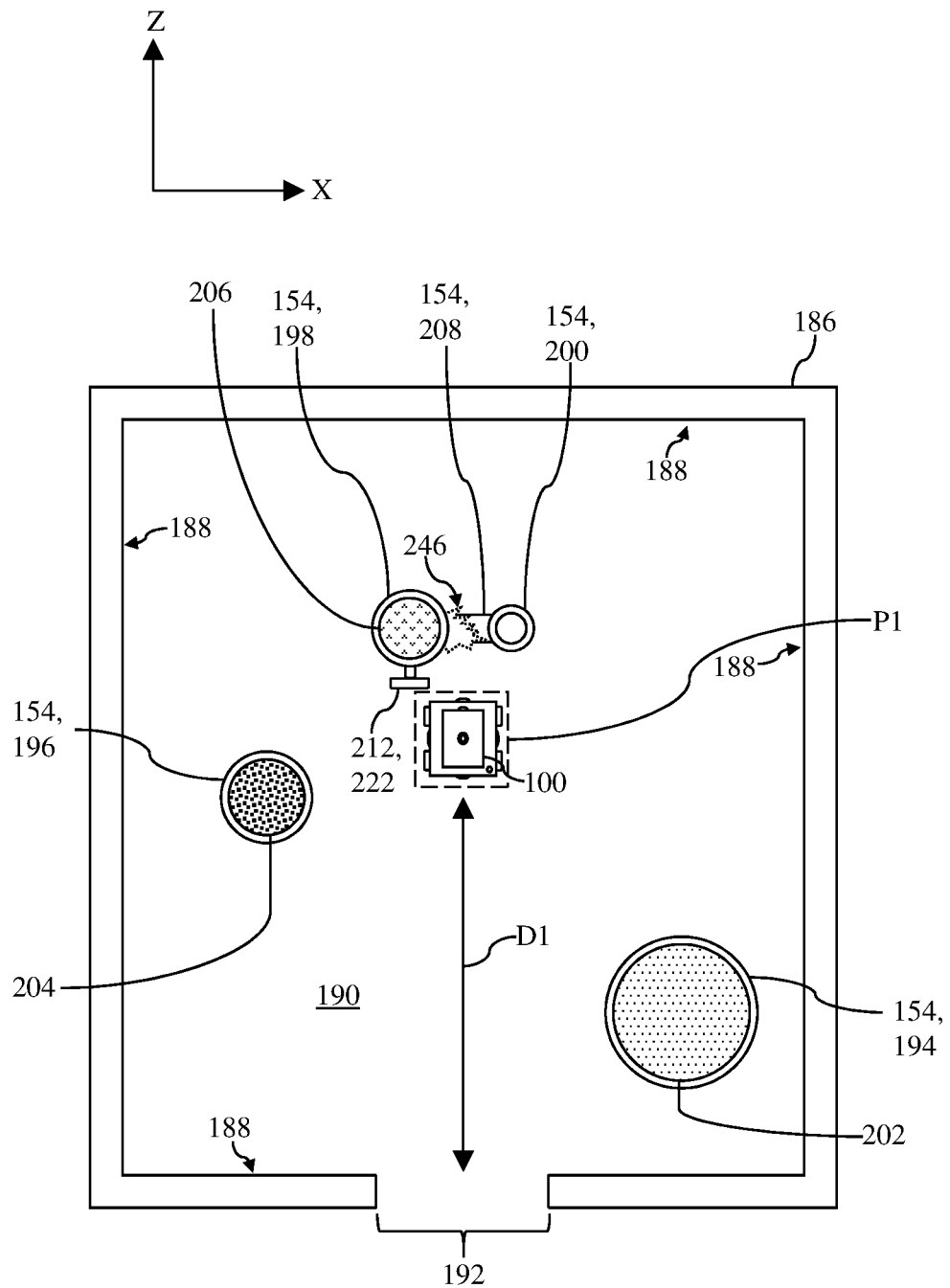
FIG. 7 shows a top view of the apparatus including the plurality of components shown in FIG. 4 being inspected by the inspection vehicle of FIGS. 1 and 2, according to embodiments.

FIG. 7 shows a top view of exhaust housing 186 (e.g., apparatus 152) including exhaust lines 194, 196, 198, 200 (e.g., components 154) and inspection vehicle 100 of leak-detection system 150 (see, FIG. 3). Inspection vehicle 100 may be positioned within and/or may be moving (e.g., along a predetermined pathway or random pathway) about exhaust housing 186 to perform the inspection process. As shown in FIG. 7, inspection vehicle 100 may have entered exhaust housing 186 via opening 192 and may have travelled in the "Y" direction a distance (D1) to a first position (P1) within exhaust housing 186. In a non-limiting example, tracking unit 148 (see, FIG. 2) of inspection vehicle 100 may transmit positional data 174 (see, FIG. 3) to leak-detection device 156, and may be used by leak-detection device to continuously monitor the position or location of inspection vehicle 100 within exhaust housing 186 during the inspection process. Positional data 174 generated and transmitted by tracking unit 148 may include, but is not limited to, the travel distance (e.g., distance (D1)) in the "X" direction and the "Y" direction, and/or the first position (P1) of inspection vehicle 100 within exhaust housing 186.

In a non-limiting example, inspection vehicle 100 may enter exhaust housing 186 to begin the inspection process based on a predetermined schedule (e.g., every day at 8:00 AM). In another non-limiting example, inspection vehicle 100 may enter exhaust housing 186 and begin the inspection process based on automatically after inspecting another apparatus (e.g., combustor) of the gas turbine system (not shown). In additional non-limiting examples, inspection vehicle 100 may enter exhaust housing 186 to begin the inspection process based on a user's request and/or when a user manual drives or puts inspection vehicle 100 in exhaust housing 186 to perform the inspection process.

In further non-limiting examples, inspection vehicle 100 may enter exhaust housing 186 to begin the inspection process after leak-detection system 150 detects, determines and/or receives undesirable operational data 178 from control system 176 of exhaust housing 186 (e.g., apparatus 152) (see, FIG. 3). For example, inspection vehicle 100 may be deployed to inspect exhaust housing 186 in response to leak-detection device 156 detecting, determining, and/or receiving operational data 178 that indicates that the actual pressure of exhaust gas 206 flowing through third exhaust line 198 (e.g., component 154) is outside of or below the desired pressure range for exhaust gas 206 flowing through third exhaust line 198. Alternatively, or additionally, inspection vehicle 100 may be deployed when an actual operational efficiency of a component, system, and/or apparatus in communication with exhaust housing 186 is below an operational efficiency threshold. For example, where exhaust gas 206 flowing through third exhaust line 198 may be supplied to and used by a heat recover steam generator (HRSG) (not shown) operably connected to the gas turbine system (not shown), inspection vehicle 100 may be deployed when an actual operational efficiency of the HRSG is below an operational efficiency threshold. In this non-limiting example, a decrease in actual operational efficiency of the HRSG below the threshold may indicate that not enough exhaust gas 206 is being supplied to the HRSG as a result of a leak in exhaust line 198. As such, inspection vehicle 100 may be deployed to exhaust housing 186 to perform the inspection process therein.

Once deployed within exhaust housing 186, inspection vehicle 100 may continuously generate and provide data to leak-detection device 156 of leak-detection system 150. For example, cameras 120, 122, 124, 126 and/or camera system 142 may continuously generate and transmit camera data 172 to leak-detection device 156. Additionally, fluid-detection tool 128 and/or fluid-detection system 146 may continuously generate and transmit fluid-detection data 168 to leak-detection device 156. Tracking unit 148 may also continuously generate and transmit positional data 174 to leak-detection device 156, as discussed herein.

Also shown in the non-limiting example of FIG. 7, exhaust housing 186 may include a fluid leak 246. Specifically, exhaust gas 206 may be leaking (e.g., fluid leak 246) from third exhaust line 198 of exhaust housing 186. Fluid leak 246 may be shown in phantom in FIG. 7 to indicate that exhaust gas 206 leaking from third exhaust line 198 is not visible to a user or cameras 120, 122, 124, 126. Additionally, fluid leak 246 may be shown in phantom to indicate that exhaust gas 206 is leaking from third exhaust line 198 at a rate or pressure that would not produce an auditory signal that could be detected by a user located within exhaust housing 186.

Figure 8:
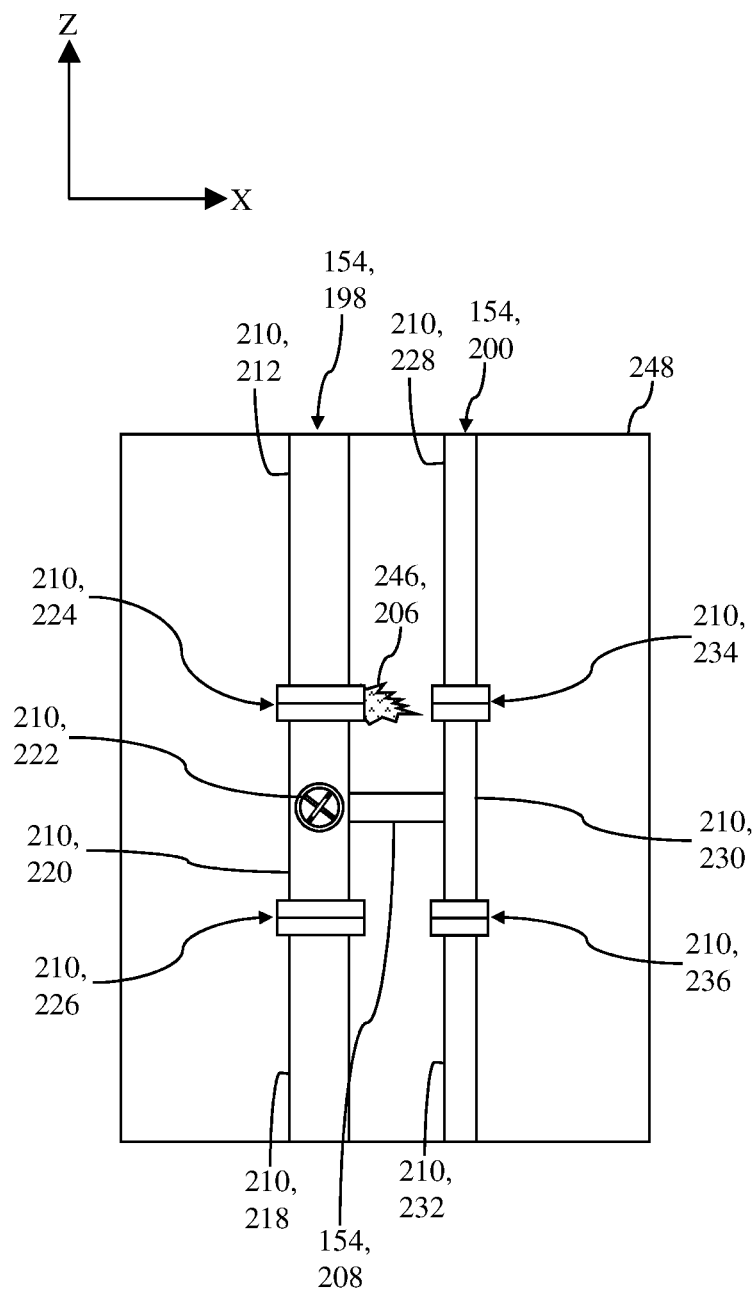
FIG. 8 shows a leak-image of components of the apparatus shown in FIG. 7 generated by the fluid-detection tool of the inspection vehicle of FIGS. 1 and 2, according to embodiments.

Rather in the non-limiting, inspection vehicle 100 may detect fluid leak 246 using fluid-detection tool 128. Turning to FIG. 8, with continued reference to FIG. 7, a leak-image 248 generated by device 132 of fluid-detection tool 128 on inspection vehicle 100 is shown. Leak-image 248 may be generated by fluid-detection tool 128 after inspection vehicle 100 has travelled in the "Y" direction a distance (D1) to the first position (P1) within exhaust housing 186, as shown in FIG. 7. In the non-limiting example where fluid-detection tool 128 is formed as real-time ultrasound imaging device, leak-image 248 may include a visual representation (e.g., color Doppler), shown as fluid leak 246, of exhaust gas 206 leaking from third exhaust line 198. Where leak-image 248 generated by fluid-detection tool 128 includes fluid leak 246, fluid-detection tool 128 and/or fluid-detection system 146 of inspection vehicle 100 may transmit leak-image 248 to leak-detection device 156 as part of fluid detection data 168 obtained and/or generated by fluid-detection tool 128. Additionally, and as discussed herein, fluid detection data 168 generated by fluid-detection tool 128 and transmitted to leak-detection device 156 may also include the composition of exhaust gas 206, the actual temperature of exhaust gas 206, and/or the actual flow rate of exhaust gas 206. As discussed herein, fluid detection data 168 may be used by leak-detection device 156 to identify the specific exhaust line 194, 196, 198, 200 of exhaust housing 186 that may be leaking the fluid (e.g., exhaust gas 206).

Once fluid-detection tool 128 detects a fluid leak within exhaust housing 186, leak-detection device 156 of leak-detection system 150 may use various forms of data to identify the specific exhaust line 194, 196, 198, 200 leaking the fluid. In non-limiting examples, leak-detection device 156 may use fluid detection data 168 including leak-image 248 generated by fluid-detection tool 128 of inspection vehicle 100, camera data 172 generated by cameras 120, 122, 124, 126 of inspection vehicle 100, positional data 174 generated by tracking unit 148 of inspection vehicle 100, operational data 178 generated by control system 176 of exhaust housing 186, and/or predetermined component data 166 stored on storage device 158 of leak-detection device 156.

Figure 9:
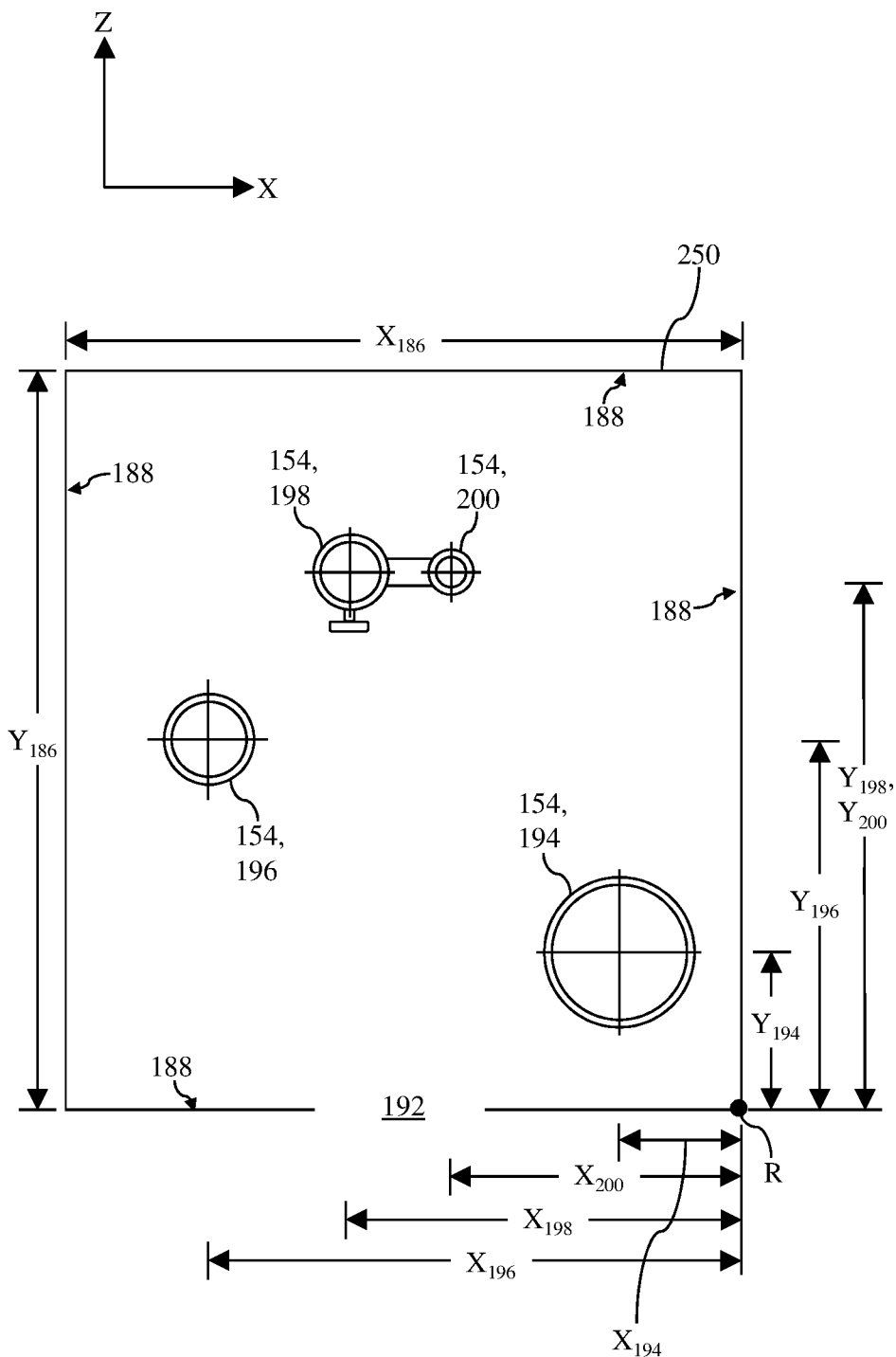
FIG. 9 shows a top schematic view of the apparatus including the plurality of components shown in FIG. 7, according to embodiments.
Figure 10:
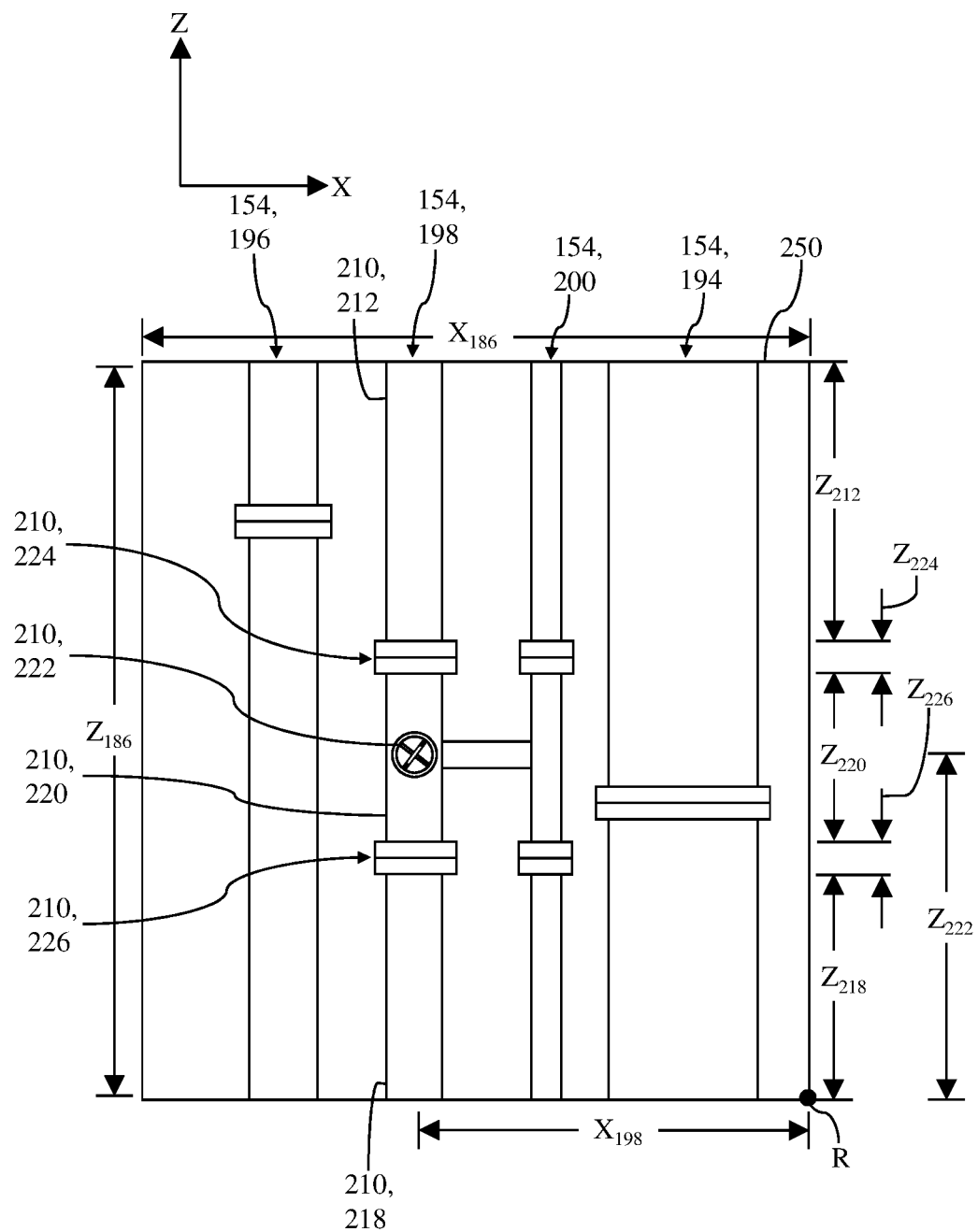
FIG. 10 shows a front schematic view of the apparatus including the plurality of components shown in FIG. 9, according to embodiments.

Turning to FIGS. 9 and 10, a schematic or visual representation 250 (hereafter, "schematic 250") of exhaust housing 186 including exhaust lines 194, 196, 198, 200 is shown. Schematic 250 of exhaust housing 186 shown in FIGS. 9 and 10 may include, for example, a plurality of previously captured, analyzed, and interactive (e.g., searchable) images of exhaust housing 186, or a three-dimensional (3D) computer model of exhaust housing 186. As discussed herein, schematic 250, and the information relating to exhaust housing 186 included therein, may be included in predetermined component data 166 (see, FIG. 3). In the non-limiting example, schematic 250 may include predetermined information and/or data relating to the size or dimensions of exhaust housing 186, and/or may define the location (L) of each exhaust line 194, 196, 198, 200, as well as the location of each feature 210 included on each exhaust line 194, 196, 198, 200 of exhaust housing 186 (see, FIG. 10). For example, exhaust housing 186 may include a predetermined dimension represented by $X_{186}$, $Y_{186}$ (see, FIG. 9), and $Z_{186}$ (see, FIG. 10). Additionally, first exhaust line 194 may be positioned within exhaust housing 186 at predetermined dimensions $X_{194}$, $Y_{194}$ (see, FIG. 9), and $Z_{194}$ (see, FIG. 10) from reference point (R). Similarly, second exhaust line 196 may be positioned within exhaust housing 186 at predetermined dimensions $X_{196}$, $Y_{196}$ (see, FIG. 9), and $Z_{196}$ (see, FIG. 10), third exhaust line 198 may be positioned within exhaust housing 186 at predetermined dimensions $X_{198}$, $Y_{198}$ (see, FIG. 9), and $Z_{198}$ (see, FIG. 10), and fourth exhaust line 200 may be positioned within exhaust housing 186 at predetermined dimensions $X_{200}$, $Y_{200}$ (see, FIG. 9), and $Z_{200}$ (see, FIG. 10). The predetermined dimensions for each exhaust line 194, 196, 198, 200 may define and/or establish the predetermined locations (L1-L4) of each exhaust line 194, 196, 198, 200 within exhaust housing 186, as discussed herein.

Additionally, and as shown in FIG. 10, schematic 250 may include predetermined information and/or data relating to the predetermined dimensions and/or may locate each feature 210 included on each exhaust line 194, 196, 198, 200 of exhaust housing 186. For example, all features 210 of third exhaust line 198 may be positioned with exhaust housing 186 at predetermined dimensions $X_{194}$, $Y_{194}$ (see, FIG. 9) from reference point (R) as a result of being included in third exhaust line 198. However, the predetermined "Z" direction dimension may differ for each feature 210. That is, first conduit portion 212 of third exhaust line 198 may be positioned within exhaust housing 186 at predetermined dimension $Z_{212}$ from reference point (R), second conduit portion 218 may be positioned at predetermined dimension $Z_{218}$, and valve portion 220 may be positioned at predetermined dimension $Z_{220}$. Additionally, valve 222 of third exhaust line 198 may be positioned within exhaust housing 186 at predetermined dimension 2222 from reference point (R), first flange 224 may be positioned within exhaust housing 186 at predetermined dimension $Z_{224}$, and second flange 226 may be positioned at predetermined dimension $Z_{226}$. Although only the predetermined dimensions are shown for features 210 of third exhaust line 198, it is understood that the predetermined dimensions for each feature 210 included in each exhaust line 194, 196, 198, 200 may be know and/or established in schematic 250. As discussed herein, defining the location and dimensions for each feature 210 of exhaust lines 194, 196, 198, 200 may aid in identifying the specific feature 210 that may be leaking fluid within exhaust housing 186.

Utilizing the information and/or data received thereon, leak-detection device 156 of leak-detection system 150 may identify the specific exhaust line (e.g., third exhaust line 198) leaking a fluid within exhaust housing 186. For example, utilizing the positional data 174 generated by tracking unit 148 of inspection vehicle 100, and schematic 250 included in predetermined component data 166, leak-detection device 156 may identify that third exhaust line 198 is leaking exhaust gas 206. Specifically, positional data 174 may indicate that inspection vehicle 100 has travelled in the "Y" direction a distance (D1) to a first position (P1) within exhaust housing 186. In comparing schematic 250 shown in FIG. 9 and first position (P1) of inspection vehicle 100 shown in FIG. 7, it may be determined that inspection vehicle 100 in first position (P1) may be positioned adjacent to and/or inspecting third exhaust line 198 and fourth exhaust line 200. Put another way, in comparing positional data 174 and predetermined component data 166 including schematic 250, it may be determined that inspection vehicle 100 has moved beyond the predetermined dimension $Y_{194}$ of first exhaust line 194, and predetermined dimension $Y_{196}$ of second exhaust line 196, but not the predetermined dimension $Y_{198}$ of third exhaust line 198, and predetermined dimension $Y_{200}$ of fourth exhaust line 200. As such, fluid leak 246 detected by fluid-detection tool 128 may not be coming from first exhaust line 194 or second exhaust line 196, but rather one of third exhaust line 198 or fourth exhaust line 200.

To identify the specific exhaust line leaking a fluid within exhaust housing 186, leak-detection device 156 may use, analyze and/or compare additional data or information. Continuing the non-limiting example where inspection vehicle 100 is positioned in first position (P1) within exhaust housing 186, leak-detection device 156 may, for example, compare the known composition of the fluid (e.g., exhaust gas 206) flowing through third exhaust line 198 or fourth exhaust line 200, included in predetermined component data 166, with the detected composition of fluid leak 246 (e.g., exhaust gas 206) as detected by fluid-detection tool 128. In this non-limiting example however, leak-detection device 156 may not identify third exhaust line 198 or fourth exhaust line 200 as including fluid leak 246 as a result of both third exhaust line 198 and fourth exhaust line 200 including, when applicable, exhaust gas 206. In turn, leak-detection device 156 may also use operational data 178, which may indicate that valve 222 on third exhaust line 198 is closed, and no exhaust gas 206 is flowing to fourth exhaust line 200 via connector 208. As such, in this non-limiting example, leak-detection device 156 may identify third exhaust line 198 as including fluid leak 246.

In similar non-limiting examples, leak-detection device 156 may compare the desired temperature range of the fluid (e.g., exhaust gas 206) flowing through third exhaust line 198 or fourth exhaust line 200, included in predetermined component data 166, with the actual temperature of fluid leak 246 (e.g., exhaust gas 206) as detected by fluid-detection tool 128. Additionally or alternatively, leak-detection device 156 may compare the desired pressure range of the fluid (e.g., exhaust gas 206) flowing through third exhaust line 198 or fourth exhaust line 200, included in predetermined component data 166, with the actual flow rate of fluid leak 246 (e.g., exhaust gas 206) as detected by fluid-detection tool 128. In these non-limiting examples, leak-detection device 156 may identify third exhaust line 198 as including fluid leak 246 and/or leaking exhaust gas 206 when the actual temperature/actual flow rate detected by fluid-detection tool 128 is within the desired ranges and/or may be mathematically associated with the fluid flowing through third exhaust line 198. For example, where exhaust gas 206 flowing through third exhaust line 198 includes a desired or predetermined temperature range of approximately 100 Celsius (C) to approximately 120 C, and fluid leak 246 includes a detected temperature of 95 C, leak-detection device 156 may determine, in association with known first position (P1) of inspection vehicle 100, that third exhaust line 198 may include fluid leak 246. Additionally where ambient temperature within exhaust housing 186 is 24 C, fluid heat exchange between exhaust gas 206 leaking into exhaust housing 186 may (mathematically) support for identifying third exhaust line 198 as including fluid leak 246.

In another non-limiting example, leak-detection device 156 may use leak-image 248 included in fluid detection data 168 and generated by fluid-detection tool 128 of inspection vehicle 100, and schematic 250 included in predetermined component data 166, to identify third exhaust line 198 including fluid leak 246. Specifically, leak-detection device 156 may compare leak-image 248 generated by fluid-detection tool 128, as shown in FIG. 8, with schematic 250 of exhaust housing 186 shown in FIGS. 9 and 10. In comparing, analyzing, and/or layering leak-image 248 and schematic 250 (including predetermined dimensions for each exhaust line included in exhaust housing 186), it may be determined that fluid leak 246 depicted in leak-image 248 is substantially aligned with and/or originating for from the portion of schematic 250 that includes third exhaust line 198. Additionally or alternatively, comparing the predetermined dimensions (e.g., $X_{198}$, $Y_{198}$, $Z_{198}$) of third exhaust line 198 in schematic 250 with the ends of detect fluid leak 246 in leak-image 248, it may be determined that at least one end (e.g., leak origination end) may be included within and/or may be approximate with the predetermined dimensions (e.g., $X_{198}$, $Y_{198}$, $Z_{198}$) of third exhaust line 198 in schematic 250. As such, leak-detection 156 of leak-detection system 150 may identify third exhaust line 198 as leaking exhaust gas 206 and/or including fluid leak 246.

Continuing the example above where leak-detection device 156 may compare leak-image 248 generated by fluid-detection tool 128, as shown in FIG. 8, with schematic 250 of exhaust housing 186 shown in FIGS. 9 and 10, the specific feature 210 leaking the fluid within exhaust housing 186 may also be identified. That is, once leak-detection device 156 identifies third exhaust line 198 as leaking exhaust gas 206 within exhaust housing 186, leak-detection device 156 may also identify the specific feature which is leaking exhaust gas 206 as well. As similarly discussed herein, by comparing, analyzing, and/or layering leak-image 248 and schematic 250 (including predetermined dimensions for each exhaust line included in exhaust housing 186), it may be determined that fluid leak 246 depicted in leak-image 248 is substantially aligned with and/or originating for from first flange 224 of third exhaust line 198 represented in schematic 250. Additionally or alternatively, comparing the predetermined dimensions of the various features 210 (e.g., X, Y, Z) of third exhaust line 198 in schematic 250 with detected fluid leak 246 in leak-image 248, it may be determined that fluid leak 246 may be included within, and/or may be approximate with the predetermined dimensions $X_{198}$, $Y_{198}$, $Z_{224}$ of first flange 224 of third exhaust line 198 in schematic 250. As such, leak-detection 156 of leak-detection system 150 may identify first flange 224 as the specific feature 210 of third exhaust line 198 leaking exhaust gas 206 and/or including fluid leak 246.

Figure 11:
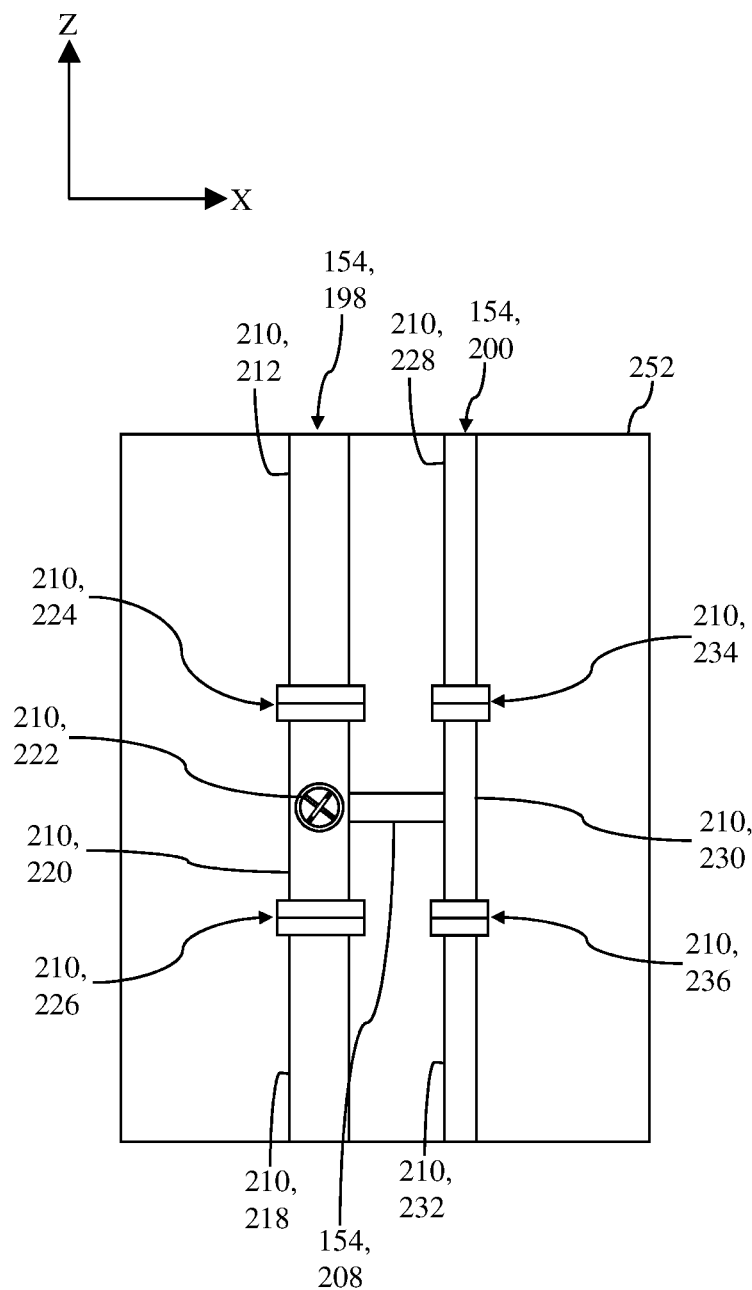
FIG. 11 shows a real-time image of components of the apparatus shown in FIGS. 7 and 8 generated by a camera of the inspection vehicle of FIGS. 1 and 2, according to embodiments.

Turning to FIG. 11, a real-time image 252 generated by camera 120 of inspection vehicle 100 is shown. Real-time image 252 may be generated by camera 120 after inspection vehicle 100 has travelled in the "Y" direction a distance (D1) to the first position (P1) within exhaust housing 186, as shown in FIG. 7, and/or after fluid-detection tool 128 detects fluid leak 246 as discussed herein. Alternatively, and as discussed herein, real-time image 252 may be one of many, or a continuous feed (e.g., video), of images generated by camera 120 during an inspection, as discussed herein. In the non-limiting example, and based on the position of inspection vehicle 100 within exhaust housing 186, real-time image 252 may include, depict, and/or display third exhaust line 198 and fourth exhaust line 200 only. As discussed herein, camera 120 and/or camera system 142 of inspection vehicle 100 may transmit real-time image 252 to leak-detection device 156 as part of camera data 172 obtained and/or generated by camera 120.

In additional non-limiting examples, leak-detection device 156 may use camera data 172 generated by cameras 120, 122, 124, 126 of inspection vehicle 100 and schematic 250 included in predetermined component data 166, along with fluid detection data 168 (including leak-image 248), to identify and/or verify third exhaust line 198 includes fluid leak 246. Specifically, leak-detection device 156 may compare real-time image 252 generated by camera 120, as shown in FIG. 8, with schematic 250 of exhaust housing 186 shown in FIG. 9. As discussed herein, comparing, analyzing, and/or layering leak-image 248 and schematic 250 (including predetermined dimensions for each exhaust line included in exhaust housing 186) may allow leak-detection device 156 to determine that fluid leak 246 depicted in leak-image 248 is substantially aligned with and/or originating for from the portion of schematic 250 that includes third exhaust line 198. Additionally, comparing, analyzing, and/or layering real-time image 252 and schematic 250 may verify that inspection vehicle 100 is within proximity of third exhaust line 198, and currently inspecting and/or obtaining data (e.g., fluid detection data 168) for third exhaust line 198. As such, real-time image 252 generated by camera 120 of inspection vehicle 100 may aid in identifying and/or verifying third exhaust line 198 include fluid leak 246.

Figure 12:
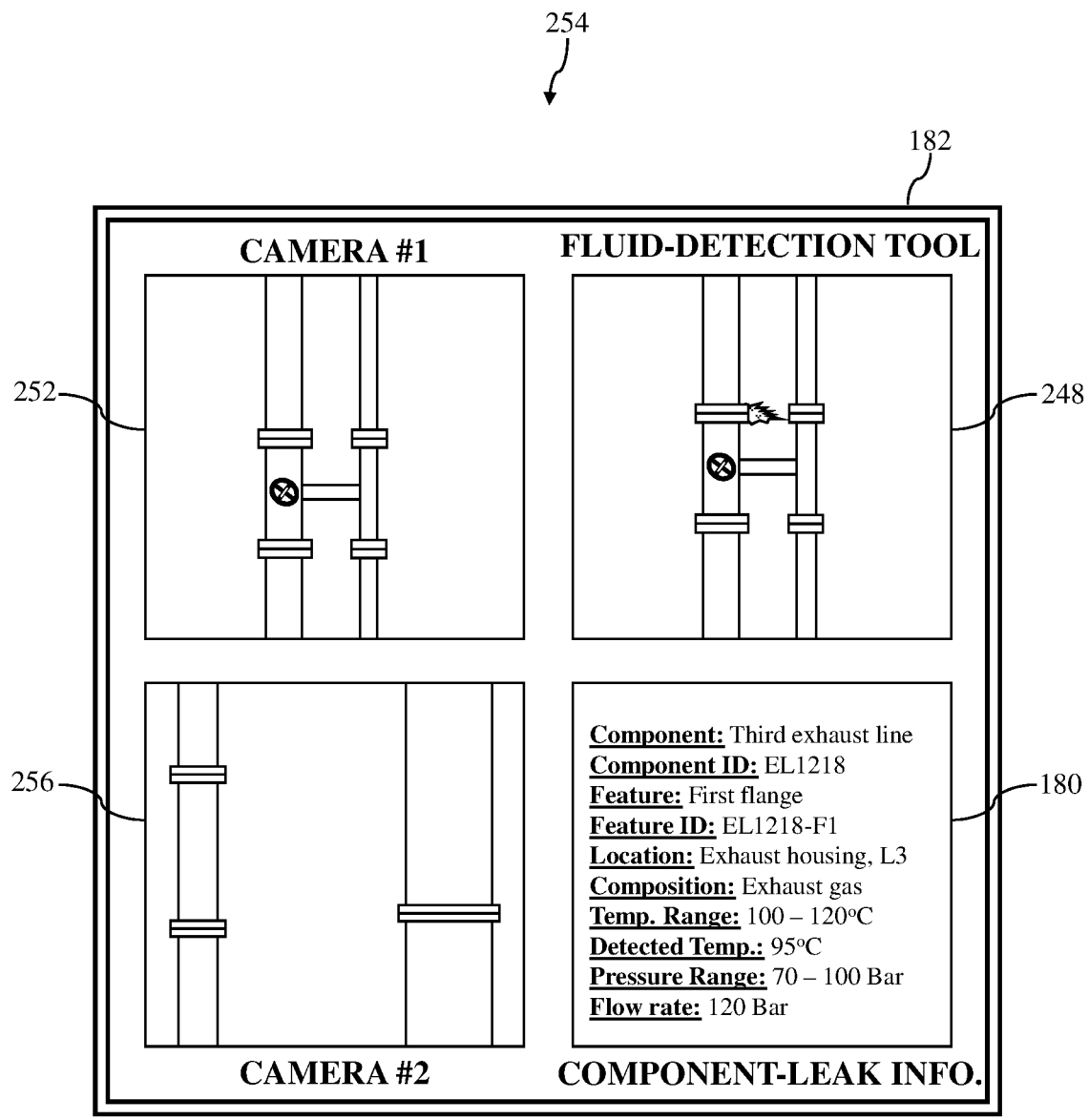
FIG. 12 shows an output device of the leak-detection system shown in FIG. 3 including the leak-image of FIG. 8, the real-time image of FIG. 11, and a notification including component-leak information, according to embodiments.

In the non-limiting examples, once leak-detection device 156 of leak-detection system 150 (see, FIG. 3) identifies third exhaust line 198 as including fluid leak 246 and/or as leaking exhaust gas 206 within exhaust housing 186, leak-detection device 156 may generate and provide a notification including component-leak information 180. Turning to FIG. 12, and as discussed herein, leak-detection device 156 may provide the notification 254 including component-leak information 180 using output device 182. In the non-limiting example shown in FIG. 12, output device 182 may be formed as a display or computer screen. In the non-limiting example, component-leak information 180 included in notification 254 generated by leak-detection device 156 may include, for example, the name of the identified specific component (e.g., "main exhaust line"), the identified component ID tag (e.g., "EL1218"), the identified feature of the specific component (e.g., "first flange"), the identified feature ID tag (e.g., "EL1218-F1"), the location of the identified specific component (e.g., "exhaust housing, L3"), the composition of the fluid leaking from the identified specific component (e.g., "exhaust gas"), the desired temperature range of the fluid leaking from the identified specific component (e.g., "100-120 C"), the detected temperature of the fluid leaking from the identified specific component (e.g., "95 C"), the desired pressure range for the fluid leaking from the identified specific component (e.g., "70-100 Bar"), and the actual flow rate of the fluid leaking from the identified specific component (e.g., "120 Bar").

As discussed herein, the information or data included in component-leak information 180 may be determined based on a variety of data generated, detected, determined, and/or identified by various portions of leak-detection system 150. For example, and as discussed herein with respect to FIGS. 7-11, leak-detection device 156 may use predetermined component data 166, positional data 174, fluid detection data 168, camera data 172, and/or operational data 178 to identify third exhaust line 198 and/or first flange 224 of third exhaust line 198 that may include fluid leak 246 and/or is leaking exhaust gas 206. Once third exhaust line 198 and/or first flange 224 of third exhaust line 198 are identified, leak-detection device 156 may use additional predetermined component data 166 to identify the predetermined component ID (e.g., component ID tag 238) for third exhaust line 198, and/or the predetermined feature ID (e.g., feature ID tag 244) for first flange 224 of third exhaust line 198. Once identified by leak-detection device 156 using predetermined component data 166, component-leak information 180 may include the component ID and/or feature ID for third exhaust line 198. Additionally, the composition of the fluid (e.g., exhaust gas 206) leaking from the identified specific component (e.g., third exhaust line 198) including in component-leak information 180 may be identified, for example, by leak-detection device 156, after identifying third exhaust line 198 includes fluid leak 246, using predetermined component data 166. Alternatively, the composition of the fluid including in component-leak information 180 may be identified, for example, by fluid-detection tool 128 of inspection vehicle 100, and provided to leak-detection device 156 in fluid detection data 168.

Additionally as shown in FIG. 12, notification 254 provided on output device 182 may also include various views and/or visuals of images captured by inspection vehicle 100 when performing the inspection process to identify third exhaust line 198 as including fluid leak 246. For example, notification 254 provided by leak-detection device 156 on output device 182 may include leak-image 248 generated by device 132 of fluid-detection tool 128 on inspection vehicle 100, and real-time image 252 generated by camera 120 of inspection vehicle 100. Additionally, and as shown in the non-limiting example in FIG. 12, notification 254 provided by leak-detection device 156 on output device 182 may include another real-time image 256 generated by camera 122 of inspection vehicle 100.

In other non-limiting examples, notification 254 provided on output device 182 may include distinct visuals and/or images than those shown in the non-limiting example of FIG. 12. For example, in place of real-time image 256, notification provided on output device 182 may include schematic 250 similar to FIG. 9, identifying the location (L3) of third exhaust line 198 leaking exhaust gas 206.

Figure 13:
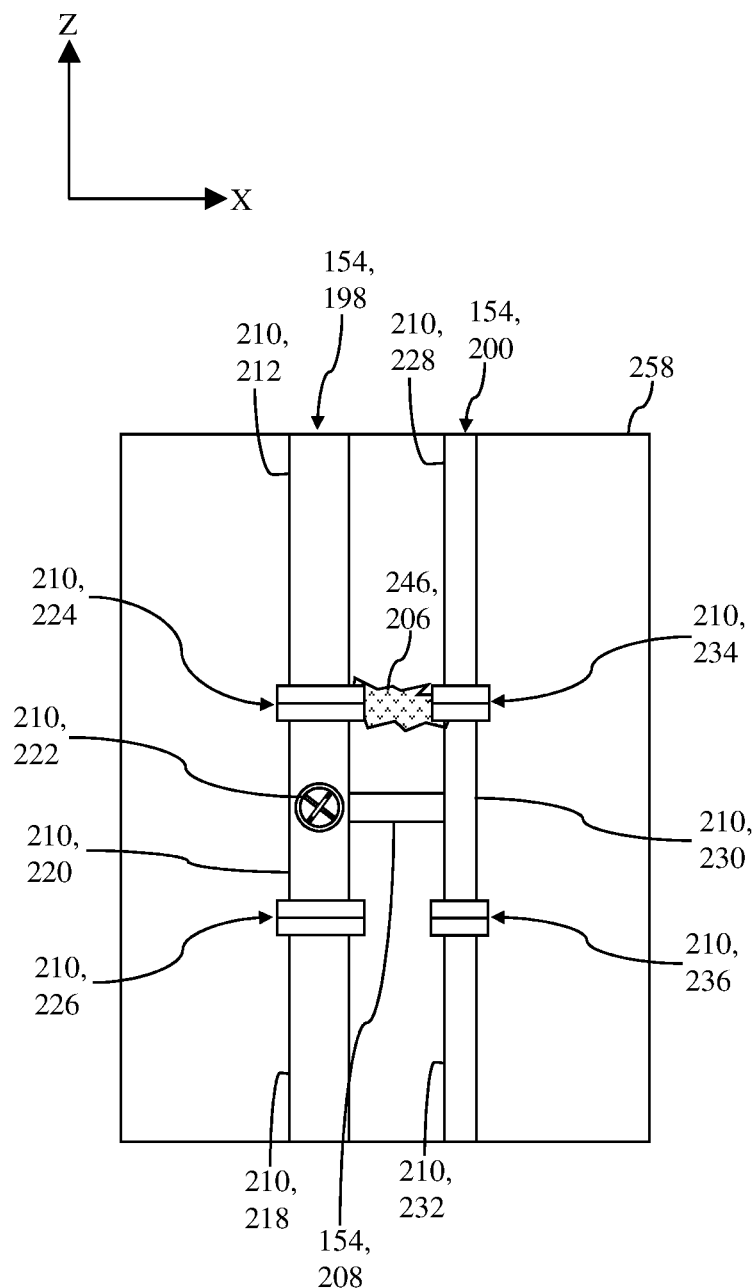
FIG. 13 shows a leak-image of components of the apparatus shown in FIG. 7 generated by the fluid-detection tool of the inspection vehicle of FIGS. 1 and 2, according to additional embodiments.

In another non-limiting example shown and discussed herein with respect to FIGS. 13-17, leak-detection device 156 of leak-detection system 150 may require additional information and/or data to identify the specific exhaust line 194, 196, 198, 200 of exhaust housing 186 that may include fluid leak 246 and/or may be leaking fluid therein. For example, FIG. 13 shows leak-image 258 generated by device 132 of fluid-detection tool 128 on inspection vehicle 100. Similar to leak-image 248 shown in FIG. 8, leak-image 258 may be generated by fluid-detection tool 128 after inspection vehicle 100 has travelled in the "Y" direction a distance (D1) to the first position (P1) within exhaust housing 186, as shown in FIG. 7. However in the non-limiting example shown in FIG. 13, and distinct from leak-image 248, fluid leak 246 detected by fluid-detection tool 128 may appear to span between third exhaust line 198 and fourth exhaust line 200. That is, fluid leak 246 in leak-image 258 may appear to originate from either third exhaust line 198 or fourth exhaust line 200. Additionally in the non-limiting example, operational data 178 may indicate that valve 222 may be open, and exhaust gas 206 may be flowing through and/or within both third exhaust line 198 and fourth exhaust line 200 positioned within exhaust housing 186. As a result, and distinct from the process of identifying the specific exhaust line as discussed herein with respect to FIGS. 7-11, leak-detection device 156 may not be able to identify whether third exhaust line 198 or fourth exhaust line 200 is leaking exhaust gas 206 using leak-image 258. That is, because fluid leak 246 in leak-image 258 extends between both third exhaust line 198 and fourth exhaust line 200, leak-detection device 156 may not be able to identify which exhaust line within exhaust housing 186 may be leaking exhaust gas 206; even with the additional information and/or data included in predetermined component data 166, camera data 172, positional data 174, and/or operational data 178, as discussed herein.

Figure 14:
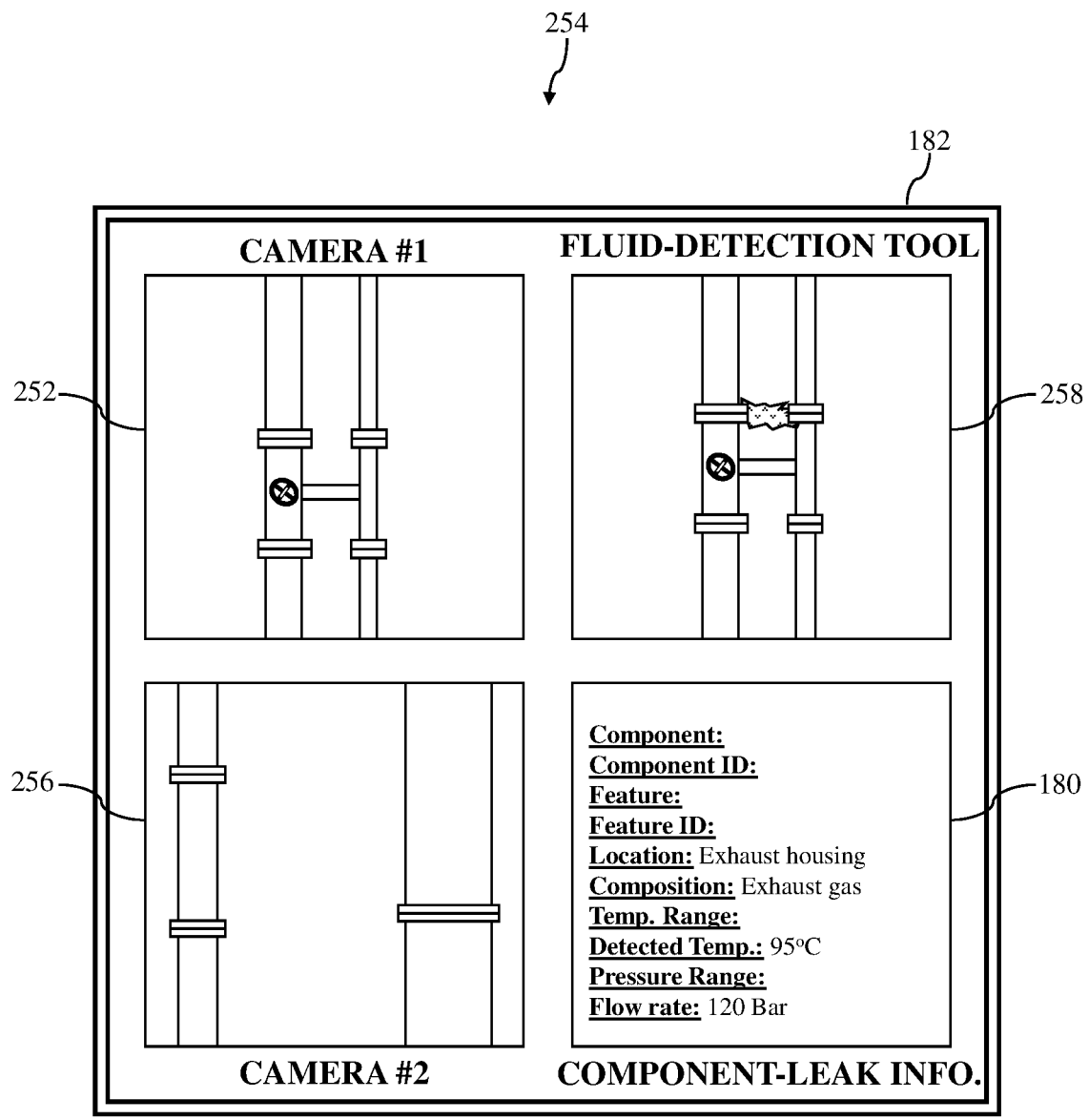
FIG. 14 shows an output device of the leak-detection system shown in FIG. 3 including the leak-image of FIG. 13, the real-time image of FIG. 11, and a notification including a portion of the component-leak information, according to additional embodiments.

Leak-detection device 156 may however be able to identify and/or determine at least a portion of component-leak information 180 include in notification 254. Turning to FIG. 14, leak-detection device 156 may generate and provide notification 254 including an incomplete component-leak information 180 on output device 182. In comparing the non-limiting example of notification 254 in FIG. 14 with notification 254 shown in FIG. 12, it may be understood that component-leak information 180 of notification 254 shown in FIG. 14 may be incomplete and/or temporarily missing information and/or data. In the non-limiting example, component-leak information 180 may only include, a partial location of the component (e.g., "exhaust housing"), the composition of the fluid leaking within exhaust housing 186 (e.g., "exhaust gas"), the detected temperature of the fluid leaking from the identified specific component (e.g., "95° C."), and the actual flow rate of the fluid leaking from the identified specific component (e.g., "120 Bar"). The information and/or data included within partially complete component-leak information 180 of notification 254 shown in FIG. 14, may be information and/or data that may be determined, detected, identified, and/or provided without leak-detection device 156 having identified the specific exhaust line that may be leaking fluid within exhaust housing 186. The information and/or data included within partially complete component-leak information 180 of notification 254 may be determined using predetermined component data 166, fluid detection data 168 (including leak-image 258), camera data 172, positional data 174, and/or operational data 178.

Figure 15:
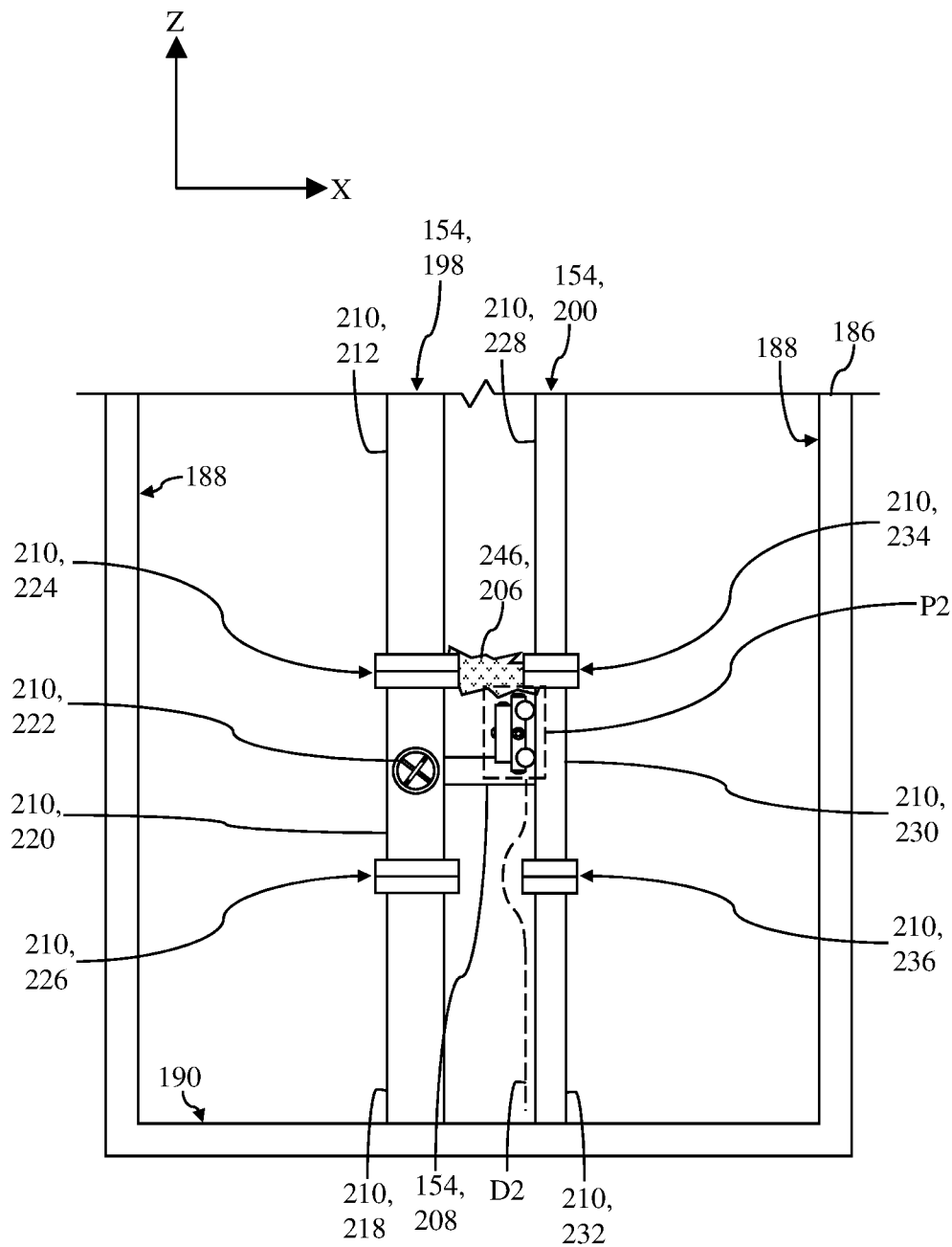
FIG. 15 shows a front view of a portion of the apparatus including the plurality of components being inspected by the inspection vehicle of FIGS. 1 and 2, according to additional embodiments.

In the non-limiting example where leak-detection device 156 may not be able to identify which exhaust line within exhaust housing 186 may be leaking exhaust gas 206 using leak-image 258, additionally inspection processes may be performed. For example, inspection vehicle 100 may move to a distinct position within exhaust housing 186 to obtain additional leak-images. As shown in FIG. 15, once it is determined that leak-detection device 156 may not identify which exhaust line within may be leaking exhaust gas 206 using leak-image 258, leak-detection device 156 may instruct propulsion assembly 134 (see, FIG. 1) of inspection vehicle 100 to move within exhaust housing 186. Specifically, leak-detection device 156 may instruct propulsion assembly 134 of inspection vehicle to adjust the position of inspection vehicle 100 from the first position (P1) (see, FIG. 7) to a second, distinct position (P2). In the non-limiting example shown in FIG. 15, second position (P2) may be a position on fourth exhaust line 200. That is, and as a result of including magnetic wheels 136 (see, FIGS. 1 and 2), inspection vehicle 100 may move or climb in the "Z" direction a distance (D2) up fourth exhaust line 200 to second position (P2). Second position (P2) may be determined by leak-detection device 156 based on, for example, leak-image 258, and more specifically analyzing leak-image 258 and determining that fluid leak 246 may be detected on either third exhaust line 198 or fourth exhaust line 200 in the "Z" direction from base surface of exhaust housing 186.

Figure 16:
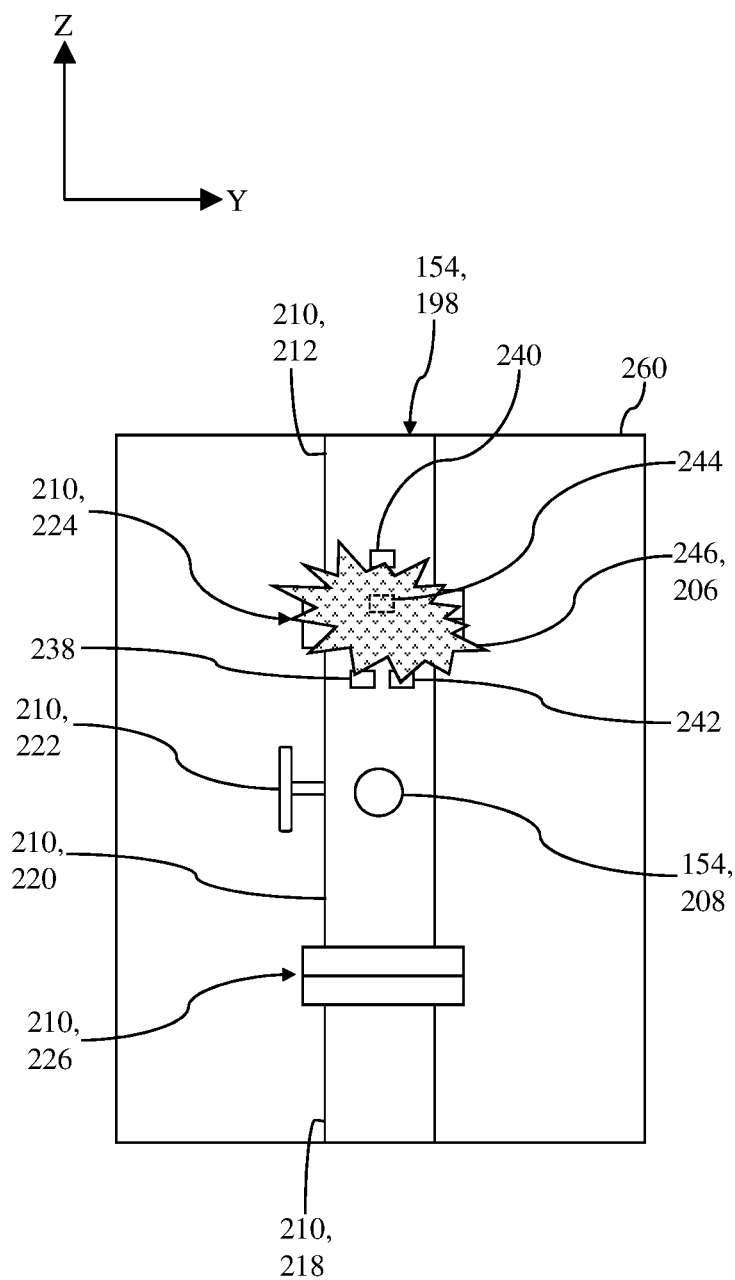
FIG. 16 shows a supplemental leak-image of a leaking component of the apparatus shown in FIG. 7 generated by the fluid-detection tool of the inspection vehicle of FIGS. 1 and 2, according to additional embodiments.

Once inspection vehicle 100 has moved or travelled in the "Z" direction a distance (D2) to second position (P2), fluid-detection tool 128 may generated another, distinct leak-image 260. More specifically, and as shown in the non-limiting example of FIG. 16, device 130 of fluid-detection tool 128 included in inspection vehicle 100 may generate leak-image 260 from second position (P2) within exhaust housing 186. In the non-limiting example, leak-detection device 156 may use leak-image 260 included in supplemental fluid detection data 170 (see, FIG. 3) and generated by fluid-detection tool 128 of inspection vehicle 100, and schematic 250 included in predetermined component data 166, to identify third exhaust line 198 including fluid leak 246. Specifically, leak-detection device 156 may compare leak-image 260 generated by fluid-detection tool 128, as shown in FIG. 16, with schematic 250 of exhaust housing 186 shown in FIGS. 9 and 10. In comparing, analyzing, and/or layering leak-image 248 and schematic 250, and as similarly discussed herein, it may be determined that fluid leak 246 depicted in leak-image 260 is substantially aligned with and/or originating for from the portion of schematic 250 that includes third exhaust line 198 and/or first flange 224 of third exhaust line 198. As such, leak-detection 156 of leak-detection system 150 may identify third exhaust line 198 as leaking exhaust gas 206 and/or including fluid leak 246, based on leak-image 260.

Additionally as shown in the non-limiting example of FIG. 16, component ID tag 238 and feature ID tags 240, 242, 244 may also be visible and/or detectable by inspection vehicle 100 from second position (P2). For example, cameras 120, 122, 124, 126 of inspection vehicle 100 may detect, identify, capture images, and/or interact with the unique tag marking (e.g., component ID tag 238 and feature ID tags 240, 242, 244) that may be specific and/or unique to third exhaust line 198 and/or each feature 210 of third exhaust line 198. Once detected and/or captured in images of component ID tag 238 and/or feature ID tags 240, 242, 244 of third exhaust line 198, cameras 120, 122, 124, 126 and/or camera system 142 of inspection vehicle 100 may provide the information, data and/or captured images to leak-detection device 156 with camera data 172. As discussed herein, leak-detection device 156 may use the camera data 172, and more specifically the images of component ID tag 238 and/or feature ID tags 240, 242, 244 of third exhaust line 198 to identify and/or verify that third exhaust line 198 is leaking exhaust gas 206 and/or to identify and/or verify that first flange 224 of third exhaust line 198 is leaking exhaust gas 206. Additionally, and as discussed herein with respect to FIG. 17, the information, data and/or captured images relating to component ID tag 238 and/or feature ID tags 240, 242, 244 of third exhaust line 198 may be used and/or included in component-leak information 180 included in notification 254.

Figure 17:
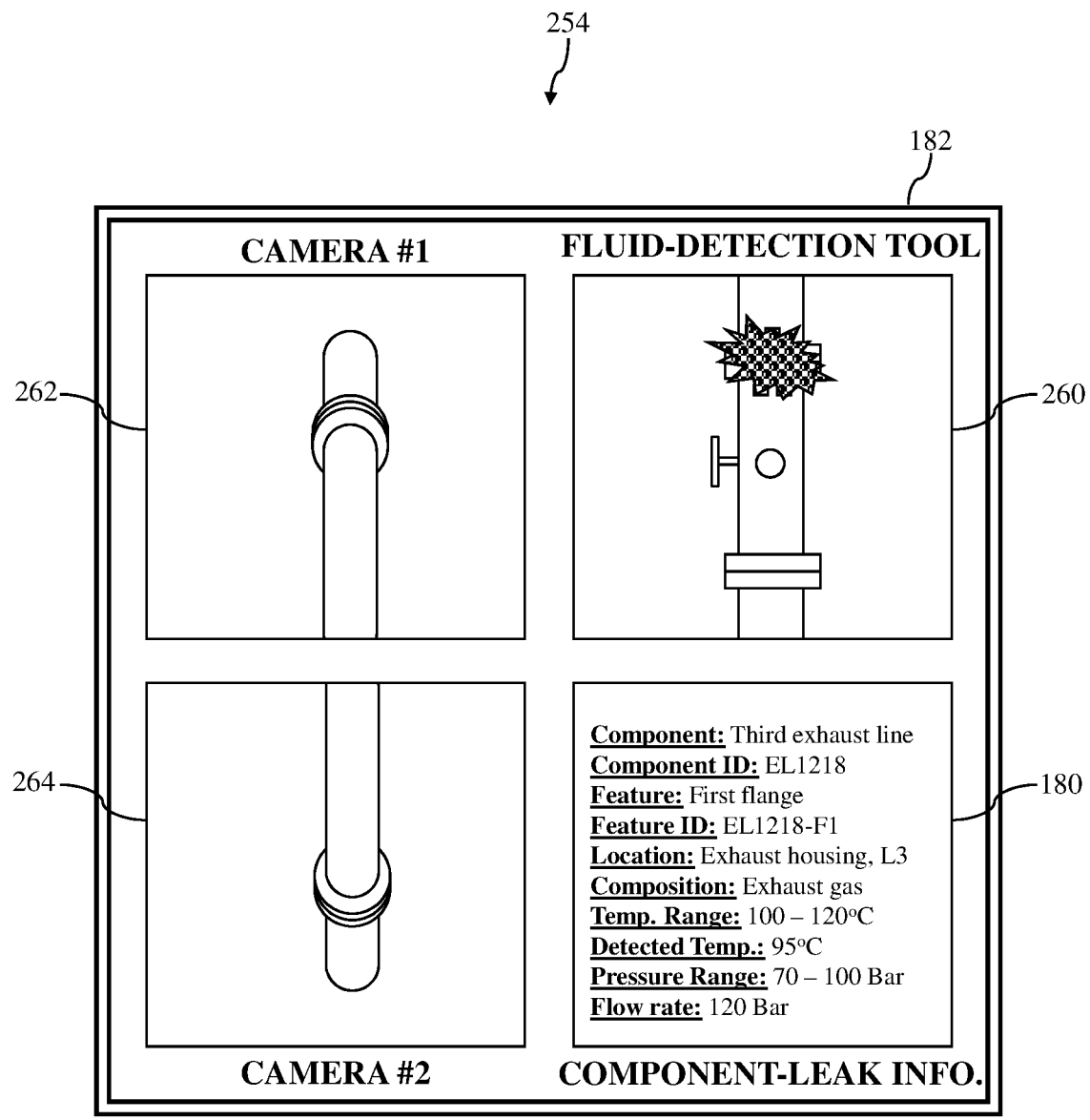
FIG. 17 shows an output device of the leak-detection system shown in FIG. 3 including the supplemental leak-image of FIG. 16, a real-time image of the component generated by a camera of the inspection vehicle, and a notification including component-leak information, according to additional embodiments.

In the non-limiting example, once leak-detection device 156 of leak-detection system 150 (see, FIG. 3) identifies third exhaust line 198 as including fluid leak 246 and/or as leaking exhaust gas 206 within exhaust housing 186, leak-detection device 156 may generate and provide a notification 254 including component-leak information 180. Turning to FIG. 17, and with comparison to notification 254 shown in FIG. 14, leak-detection device 156 may provide the notification 254 including complete component-leak information 180 using output device 182. That is, component-leak information 180 included in notification 254 generated by leak-detection device 156 may include all desired and/or pertinent information and/or data relating to identified third exhaust line 198 and/or exhaust gas 206 leaking from third exhaust line 198. As discussed herein, the information or data included in component-leak information 180 may be determined based on a variety of data generated, detected, determined, and/or identified by various portions of leak-detection system 150. For example, leak-detection device 156 may use predetermined component data 166, fluid detection data 168 including leak-image 258 (see, FIG. 13), supplemental fluid detection data 170 including leak-image 260 (see, FIG. 16) camera data 172, positional data 174, and/or operational data 178 to identify third exhaust line 198 and/or first flange 224 of third exhaust line 198 that may include fluid leak 246 and/or is leaking exhaust gas 206. Additionally in the non-limiting example, notification 254 shown in FIG. 17 may also include real-time image 262 generated by camera 120 of inspection vehicle 100, and real-time image 264 generated by camera 122 of inspection vehicle 100 when inspection vehicle 100 is in position (P2) within exhaust housing 186 (see, FIG. 15).

Figure 18:
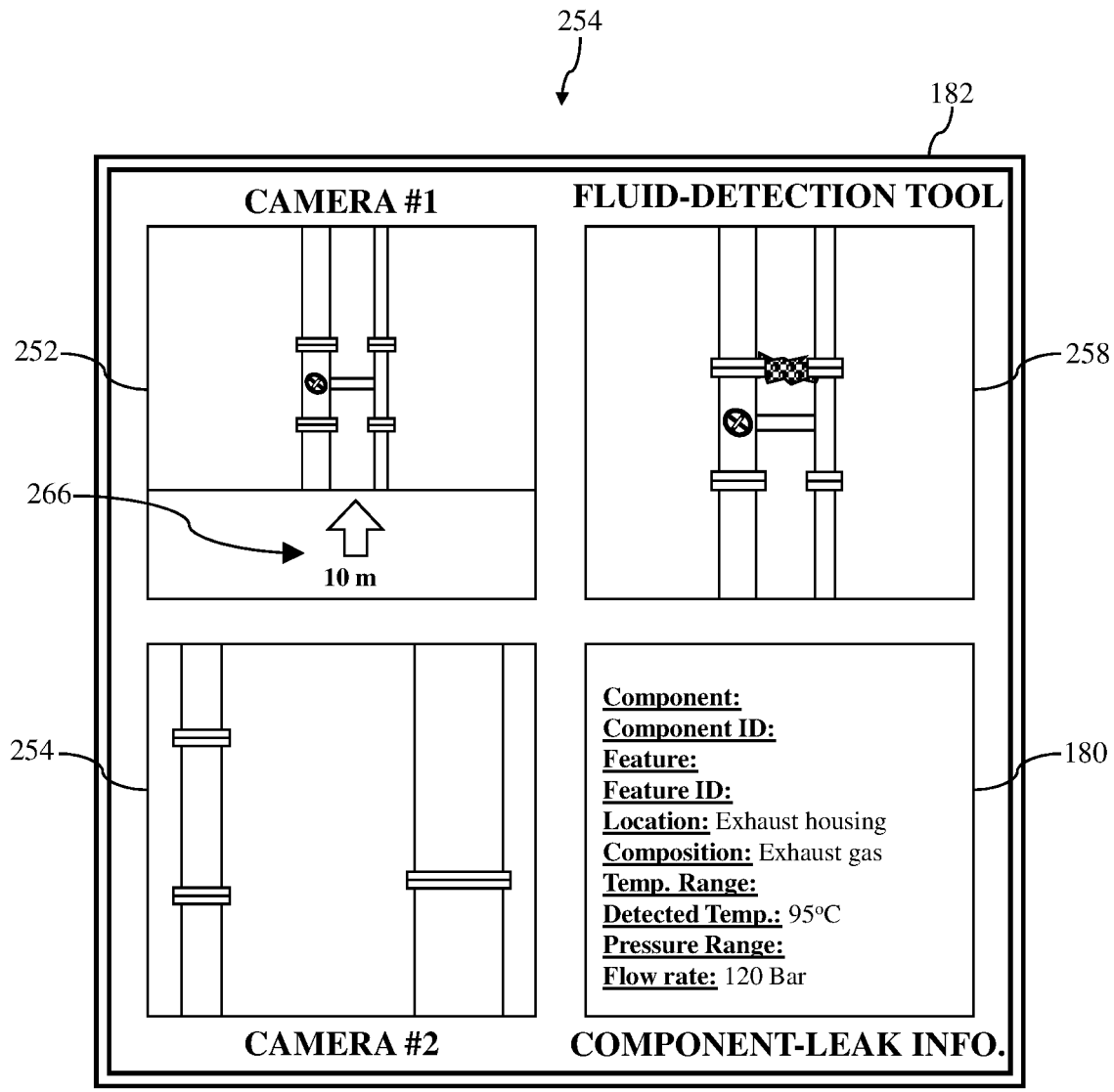
FIG. 18 shows the output device of FIG. 14 and a remote control for controlling the inspection vehicle shown in FIGS. 1 and 2, according to further embodiments.
Figure 18:
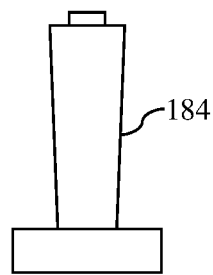

FIG. 18 shows another non-limiting example of notification 254 including component-leak information 180 provided on output device 182 from leak-detection device 156. Similar to the non-limiting example shown and discussed herein with respect to FIG. 14, notification 254 shown in FIG. 18 may include component-leak information 180 that may be incomplete and/or temporarily missing information and/or data. Additionally, notification 254 shown in FIG. 18 may include leak-image 258 generated by device 132 of fluid-detection tool 128 at the first position (P1) within exhaust housing 186, real-time image 252 generated by camera 120 of inspection vehicle 100, and real-time image 256 generated by camera 122 of inspection vehicle 100.

However distinct from the non-limiting example shown and discussed herein with respect to FIG. 14, notification 254 shown in FIG. 18 may also include direction prompts 266. Specifically, notification 254 displayed in output device 182 may include direction prompts 266 over real-time image 252. In the non-limiting example, direction prompts 266 may guide and/or direct a user controlling inspection vehicle 100 using remote control 184 to the second position (P2) within exhaust housing 186. That is, where inspection vehicle 100 is not automatic and/or controlled by leak-detection device 156 of leak-detection system 150, a user may control the movement of inspection vehicle 100 within exhaust housing 186 using remote control 184. Continuing the example discussed herein with respect to FIGS. 13 and 14, once it is determined that leak-detection device 156 may not identify which exhaust line may be leaking exhaust gas 206 using leak-image 258, leak-detection device 156 may provide direction prompts 266 to a user controlling the movement of inspection vehicle 100 using remote control 184. Using camera 120, real-time image 252, tracking unit 148, and/or positional data 174, along with direction prompts 266 provided by leak-detection device 156, a user may move inspection vehicle 100 using remote control 184 in the "Z" direction a distance (D2) up fourth exhaust line 200 to second position (P2) (see, FIG. 15). Once the user adjusts the position of inspection vehicle 100 to the second position (P2) using direction prompts 266 and remote control 184, fluid-detection tool 128 of inspection vehicle 100 may generate additional leak-images (e.g., leak-image 260). As discussed herein, the additional leak-images may be used by fluid-detection device 156 to identify which exhaust line (e.g., third exhaust line 198) is leaking fluid within exhaust housing 186, as similarly discussed herein.

The technical effect of the disclosure is to use an inspection vehicle to detect fluid leaks within an apparatus, and a leak-detection device that may identify a component(s) of the apparatus leaking fluid, and provide information relating to the leaking component.

As discussed herein, various systems and components are described as "obtaining" data (e.g., identification module 160 obtaining predetermined component data, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A leak-detection system, comprising:
   an inspection vehicle for inspecting a plurality of components of an apparatus, the inspection vehicle including:
      at least one camera positioned on a housing;
      a fluid-detection tool coupled to the housing, the fluid-detection tool detecting fluids leaking from the plurality of components of the apparatus; and
      a propulsion assembly coupled to the housing, the propulsion assembly moving the inspection vehicle; and
   a leak-detection device in electronic communication with the fluid-detection tool of the inspection vehicle, the leak-detection device configured to:
      identify a specific component of the plurality of components of the apparatus leaking a fluid using:
         fluid detection data generated by the fluid-detection tool of the inspection vehicle; and
         predetermined component data relating to each of the plurality of components of the apparatus; and
      provide a notification including component-leak information relating to the specific component of the plurality of components of the apparatus leaking the fluid,
   wherein the predetermined component data relating to each of the plurality of components of the apparatus includes at least a desired pressure range for the fluid flowing through each of the plurality of components of the apparatus to detect whether an actual pressure of the fluid flowing through the specific component of the apparatus is outside of the desired pressure range to identify the specific component leaking the fluid.

2. The leak-detection system of claim 1, wherein the predetermined component data relating to each of the plurality of components of the apparatus further includes at least one of:
- a location of each of the plurality of components of the apparatus,
- a feature of each of the plurality of components of the apparatus,
- a component identification (ID) tag for each of the plurality of components of the apparatus,
- a feature ID tag for the feature of each of the plurality of components of the apparatus,
- a schematic of the apparatus including the plurality of the components,
- a composition of the fluid flowing through each of the plurality of components of the apparatus, or
- a desired temperatures range of the fluid flowing through each of the plurality of components of the apparatus.

3. The leak-detection system of claim 2, wherein the component-leak information relating to the specific component of the plurality of components includes at least one of:
- the location of the specific component within the apparatus,
- the feature of the specific component that is leaking the fluid,
- the component ID tag of the specific component of the apparatus,
- the feature ID tag of the specific component of the apparatus,
- the composition of the fluid leaking from the specific component of the apparatus,
- the desired temperature range of the fluid flowing the specific component of the apparatus, or
- the desired pressure range for the fluid flowing through the specific component of the apparatus.

4. The leak-detection system of claim 3, wherein the fluid detection data obtained by the fluid-detection tool of the inspection vehicle includes at least one of:
- the composition of the fluid leaking from the specific component,
- an actual temperature of the fluid leaking from the specific component, or
- an actual flow rate of the fluid leaking from the specific component.

5. The leak-detection system of claim 4, wherein the component-leak information relating to the specific component of the plurality of components further includes at least one of:
- the actual temperature of the fluid leaking from the specific component, or
- the actual flow rate of the fluid leaking from the specific component.

6. The leak-detection system of claim 1, wherein the at least one camera of the inspection vehicle obtains camera data, the camera data including at least one real-time image of the plurality of components.

7. The leak-detection system of claim 6, wherein the leak-detection device further identifies the specific component leaking the fluid based on the camera data obtained by the at least one camera of the inspection vehicle.

8. The leak-detection system of claim 6, further comprising:
- at least one output device in electronic communication with the leak-detection device, the at least one output component configured to display:
  - the notification including the component-leak information provided by the leak-detection device;
  - the camera data obtained by the at least one camera of the inspection vehicle; and
  - the fluid detection data obtained by the fluid-detection tool of the inspection vehicle.

9. The leak-detection system of claim 1, wherein the leak-detection device is further configured to:
- instruct the propulsion assembly of the inspection vehicle to adjust the position of the inspection vehicle from a first position to a second position, the fluid-detection tool of the inspection vehicle obtaining:
  - the fluid detection data at the first position; and
  - supplemental fluid detection data at the second position.

10. The leak-detection system of claim 9, wherein the leak-detection device further identifies the specific component leaking the fluid based on the supplemental detection data.

11. The leak-detection system of claim 1, wherein the fluid-detection tool of the inspection vehicle includes at least one of:
- a real-time ultrasound imaging device, or
- an acoustic camera.

12. The leak-detection system of claim 11, wherein the fluid detection data obtained by the fluid-detection tool of the inspection vehicle includes a leak-image of the fluid leaking from the specific component.

13. The leak-detection system of claim 1, wherein the inspection vehicle further includes:
- a global positioning system (GPS) tracking unit coupled to the housing, the tracking unit generating positional data for the inspection vehicle inspecting the apparatus.

14. The leak-detection system of claim 13, wherein the leak-detection device further identifies the specific component leaking the fluid based on the positional data generated by the tracking unit of the inspection vehicle.

15. A leak-detection system, comprising:
- an inspection vehicle for inspecting a plurality of components of an apparatus, the inspection vehicle including:
  - at least one camera positioned on a housing, the at least one camera obtaining at least one real-time image of the plurality of components of the apparatus;
  - a fluid-detection tool coupled to the housing, the fluid-detection tool generating a leak-image of a fluid leaking from a specific component of the plurality of components of the apparatus; and
  - a propulsion assembly coupled to the housing, the propulsion assembly moving the inspection vehicle; and
- a leak-detection device in electronic communication with the fluid-detection tool of the inspection vehicle, the leak-detection device configured to:
  - identify the specific component of the plurality of components of the apparatus leaking the fluid using:
    - the leak-image generated by the fluid-detection tool of the inspection vehicle; and
    - predetermined component data relating to each of the plurality of components of the apparatus; and
  - provide a notification including component-leak information relating to the specific component of the plurality of components of the apparatus leaking the fluid;
  - wherein the predetermined component data relating to each of the plurality of components of the apparatus includes at least a desired pressure range for the fluid flowing through each of the plurality of components of the apparatus to detect whether an actual pressure of the fluid flowing through the specific component of the apparatus is outside of the desired pressure range to identify the specific component leaking the fluid.

16. The leak-detection system of claim 15, wherein the leak-detection device is further configured to:
   instruct the propulsion assembly of the inspection vehicle to adjust the position of the inspection vehicle from a first position to a second position, the fluid-detection tool of the inspection vehicle generating:
   the leak-image of the fluid leaking from the specific component at the first position; and
   a distinct leak-image of the fluid leaking from the specific component at the second position.

17. The leak-detection system of claim 16, wherein the leak-detection device further identifies the specific component leaking the fluid based on the distinct leak-image.

18. The leak-detection system of claim 15, wherein the component-leak information relating to the specific component of the plurality of components includes at least one of:
   a location of the specific component within the apparatus,
   a feature of the specific component that is leaking the fluid,
   a component identification (ID) tag of the specific component of the apparatus,
   the feature ID tag of the specific component of the apparatus,
   a composition of the fluid leaking from the specific component of the apparatus, or
   a desired temperature range of the fluid flowing the specific component of the apparatus.

19. The leak-detection system of claim 15, wherein the leak-detection device further identifies the specific component leaking the fluid based on the at least one real-time image obtained by the at least one camera of the inspection vehicle.

* * * * *